United States Patent
Kikuchi et al.

(10) Patent No.: US 12,446,475 B2
(45) Date of Patent: Oct. 14, 2025

(54) QUANTUM DEVICE

(71) Applicant: NEC Corporation, Tokyo (JP)

(72) Inventors: Katsumi Kikuchi, Tokyo (JP); Akira Miyata, Tokyo (JP); Takanori Nishi, Tokyo (JP); Kenji Nanba, Tokyo (JP); Ayami Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 491 days.

(21) Appl. No.: 17/712,300

(22) Filed: Apr. 4, 2022

(65) Prior Publication Data

US 2022/0344562 A1    Oct. 27, 2022

(30) Foreign Application Priority Data

Apr. 23, 2021 (JP) ................................. 2021-073684

(51) Int. Cl.
    *H10N 60/81*    (2023.01)
(52) U.S. Cl.
    CPC .................. *H10N 60/815* (2023.02)
(58) Field of Classification Search
    None
    See application file for complete search history.

(56) References Cited

U.S. PATENT DOCUMENTS

| | | | |
|---|---|---|---|
| 9,836,699 B1 | 12/2017 | Rigetti et al. | |
| 10,256,206 B2 | 4/2019 | Falcon et al. | |
| 10,380,496 B2 | 8/2019 | Elsherbini et al. | |
| 2009/0311828 A1* | 12/2009 | Andry | H01L 23/49827 |
| | | | 257/E21.585 |
| 2021/0398893 A1* | 12/2021 | Kikuchi | H10N 60/805 |

FOREIGN PATENT DOCUMENTS

| | | |
|---|---|---|
| JP | 2001-102479 A | 4/2001 |
| JP | 2005-044922 A | 2/2005 |
| JP | 2007-173862 A | 7/2007 |
| JP | 2019-532505 A | 11/2019 |
| WO | 2006/051821 A1 | 5/2006 |

OTHER PUBLICATIONS

JP Office Action for JP Application No. 2021-073684, mailed on Nov. 5, 2024 with English Translation.

* cited by examiner

*Primary Examiner* — Hung K Vu

(57) ABSTRACT

A quantum device according to an example embodiment includes: a quantum chip with a first surface and a second surface located on a side opposite to the first surface, in the quantum chip, at least a part of a qubit circuit being provided on the second surface; a first interposer with a third surface and a fourth surface located on a side opposite to the third surface, the first interposer being connected to the quantum chip in such a manner that the second surface of the quantum chip is opposed to the third surface of the first interposer; and a second interposer with a fifth surface and a sixth surface located on a side opposite to the fifth surface, the second interposer being connected to the first interposer in such a manner that the fourth surface of the first interpose is opposed to the fifth surface of the second interposer.

10 Claims, 31 Drawing Sheets

QUANTUM DEVICE

INCORPORATION BY REFERENCE

This application is based upon and claims the benefit of priority from Japanese patent application No. 2021-073684, filed on Apr. 23, 2021, the disclosure of which is incorporated herein in its entirety by reference.

TECHNICAL FIELD

The present disclosure relates to a quantum device.

BACKGROUND ART

In a quantum device in which a quantum chip that uses superconductivity is flip-chip mounted on an interposer, a surface of the interposer on which the quantum chip is not mounted is disposed on a sample table having a cooling function. The quantum chip is cooled by the sample table through the interposer, so that the quantum chip is kept at a predetermined temperature. In such a configuration, since one side of the interposer that is disposed on the sample table cannot be used for wiring terminals of the quantum chip to the outside, the number of terminals that can be wired to the outside is limited. However, satisfactory performance cannot be obtained unless the quantum chip is cooled to a predetermined temperature. Therefore, it is desired to achieve both the cooling of the quantum chip and an increase in the number of terminals at the same time.

When the number of terminals is increased, it is necessary to do so while keeping the conditions for achieving the performance required of a qubit circuit. Specifically, in order to maintain the coherence of the qubit circuit for a long time, it is necessary to prevent any dielectric material that causes the power loss of the electromagnetic field from being exposed in the area around the qubit circuit. Therefore, it is undesirable to increase the number of terminals of the interposer by increasing the number of layers using a dielectric material, i.e., using insulating layers.

U.S. Pat. No. 10,380,496 discloses a configuration in which a plurality of quantum chips are mounted and arranged on a package substrate in an orderly manner, and the package substrate is connected to a circuit board. In the package substrate, a large number of terminals are formed so that they can be connected to the plurality of quantum chips.

U.S. Pat. No. 10,256,206 discloses a configuration in which a conductive member is interposed between a quantum chip and a package substrate, and is connected thereto. A large number of terminals are formed in the conductive member.

U.S. Pat. No. 9,836,699 discloses a configuration in which a plurality of quantum chips are stacked on top of each other and connected to a plurality of interposers which are divided according to the function. A large number of terminals are formed in the plurality of interposers.

In the configuration disclosed in U.S. Pat. No. 10,380,496, the quantum chip is connected to the front surface of the package substrate, and the circuit board is connected to the rear surface of the package substrate. The package substrate disclosed in U.S. Pat. No. 10,380,496 is configured so as to be connected to the circuit board by soldering, and there is no via that penetrates (i.e., extends through) the wiring layer from the front surface thereof to the rear surface thereof. Therefore, it requires a space for the soldering connection, so there is a limit to the increase in the number of terminals.

In the configuration disclosed in U.S. Pat. No. 10,256,206, a plurality of bumps, which are connected to a plurality of quantum chips, are formed in one conductive member. However, since it is not a configuration in which a plurality of conductive members are stacked, there is a limit to the increase in the number of terminals.

The configuration disclosed in U.S. Pat. No. 9,836,699 does not disclose any configuration for cooling the quantum chips. Therefore, it is difficult, when the quantum chips are connected to the plurality of interposers divided according to the function, to cool the quantum chips to enable the qubit circuits to exert satisfactory performance.

Further, none of U.S. Pat. Nos. 10,380,496, 10,256,206, and 9,836,699 discloses the positional relationship between the area where the qubit circuits are formed and the dielectric material, and hence there is a problem as to whether the coherence of the qubit circuits can be maintained for a long time. Further, none of U.S. Pat. Nos. 10,380,496, 10,256,206, and 9,836,699 discloses a configuration for cooling the quantum chips, and a complicated cooling mechanism is required to achieve satisfactory performance. As described above, in each of U.S. Pat. Nos. 10,380,496, 10,256,206, and 9,836,699, there is a limit to the increase in the number of terminals connected to the outside, and there is a problem as to whether the coherence of the qubit circuit can be improved.

SUMMARY

The present disclosure has been made to solve the above-described problem, and an example object thereof is to provide a quantum device capable of improving the coherence thereof while securing terminals to be connected to the outside.

In a first example aspect, a quantum device includes: a quantum chip with a first surface and a second surface located on a side opposite to the first surface, in the quantum chip, at least a part of a qubit circuit being provided on the second surface; a first interposer with a third surface and a fourth surface located on a side opposite to the third surface, the first interposer being connected to the quantum chip in such a manner that the second surface of the quantum chip is opposed to the third surface of the first interposer; and a second interposer with a fifth surface and a sixth surface located on a side opposite to the fifth surface, the second interposer being connected to the first interposer in such a manner that the fourth surface of the first interpose is opposed to the fifth surface of the second interposer.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENTS

Figure 1:
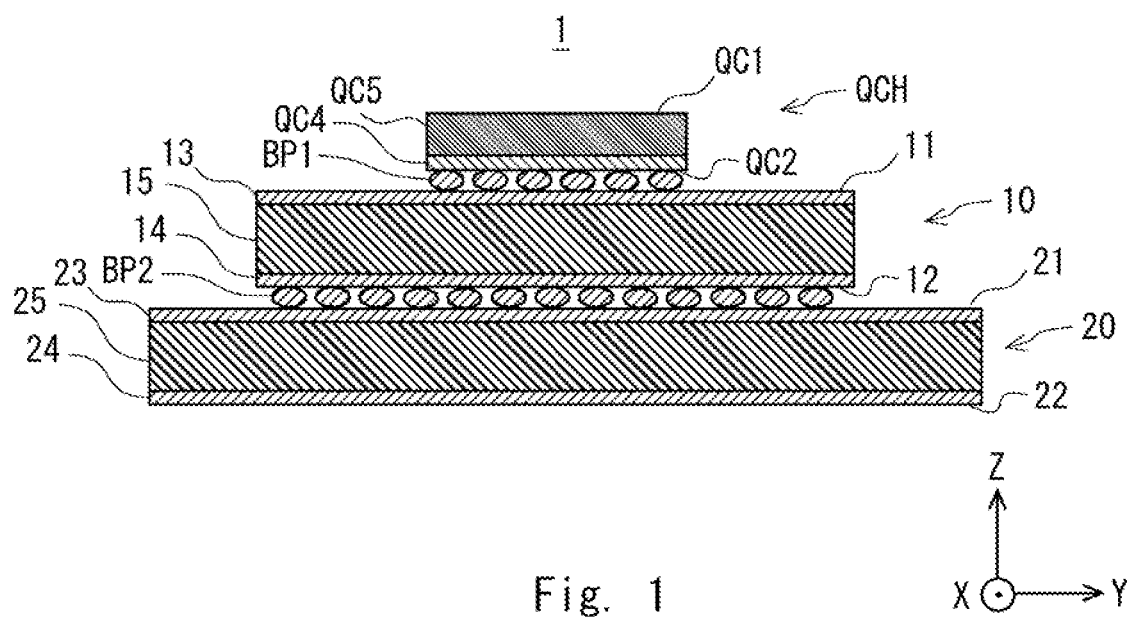
FIG. 1 is a cross-sectional diagram showing an example of a quantum device according to a first example embodiment.

The following description and the drawings are partially omitted and simplified as appropriate for clarifying the explanation. Further, the same elements are denoted by the same reference numerals (or symbols) throughout the drawings, and redundant descriptions thereof are omitted as appropriate.

First Example Embodiment

A quantum device according to a first example embodiment will be described. The quantum device according to this example embodiment includes a quantum chip that uses superconductivity in the field of quantum computing, and a plurality of interposers including input and output terminals. The quantum computing is a technical field in which data is manipulated by using a quantum mechanical phenomenon (i.e., by using qubits). The quantum mechanical phenomenon is, for example, superposition of a plurality of states (i.e., a phenomenon in which a quantum variable simultaneously assumes a plurality of different states) or entanglement (i.e., a state in which a plurality of quantum variables are related to each other irrespective of the space or the time). In a quantum chip, a qubit circuit that generates a qubit is provided.

Figure 2:
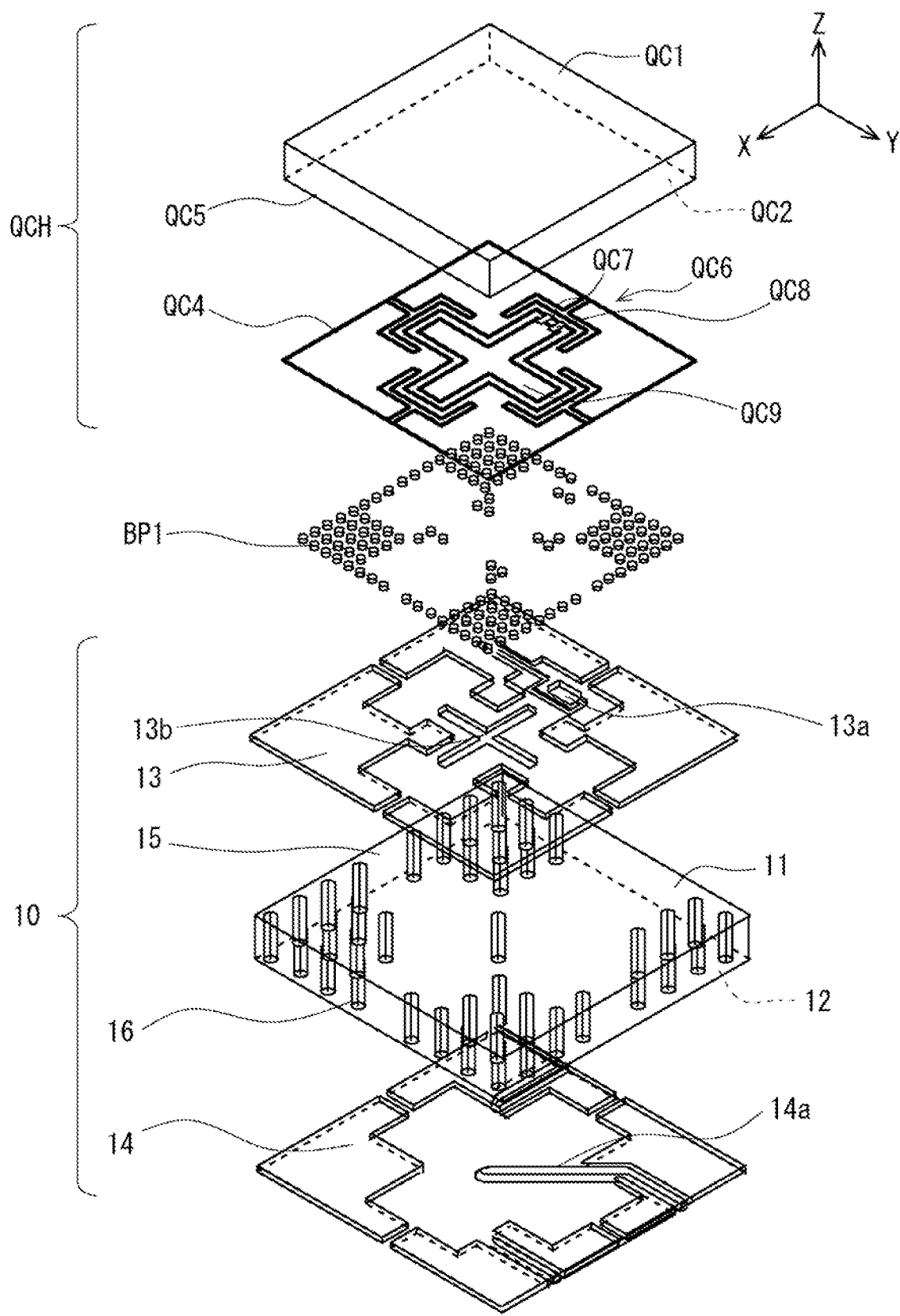
FIG. 2 is an exploded perspective view showing an example of a quantum chip and a first interposer in the quantum device according to the first example embodiment.

FIG. 1 is a cross-sectional diagram showing an example of a quantum device according to the first example embodiment. FIG. 2 is an exploded perspective view showing an example of a quantum chip and a first interposer in the quantum device according to the first example embodiment.

As shown in FIGS. 1 and 2, the quantum device 1 includes a quantum chip QCH, a first interposer 10, and a second interposer 20. The quantum device 1 further includes first bumps BP1 that connect the quantum chip QCH to the first interposer 10, and second bumps BP2 that connect the first interposer 10 to the second interposer 20. Note that although two layers composed of the first and second interposers 10 and 20 are shown as the interposers, the number of layers of interposers is not limited to two, and may be three or more. In the following description, the configuration of each of <Quantum Chip>, <First Bumps>, <First Interposer>, <Second Bumps>, and <Second Interposer> will be explained.

<Quantum Chip>.

The quantum chip QCH includes a chip core material QC5 and a wiring layer QC4. Regarding the shape of the chip core material QC5, it is, for example, a plate-like substrate. Further, the chip core material QC5 has one plate surface and the other plate surface located on a side opposite to the one plate surface. The one plate surface is referred to as a first surface QC1 and the other plate surface is referred to as a second surface QC2. Therefore, the quantum chip QCH has plate surfaces constituting the first and second surfaces QC1 and QC2. For example, the first and second surfaces QC1 and QC2 are both rectangular. As described above, the quantum chip QCH and the chip core material QC5 have the first and second surfaces QC1 and QC2.

The chip core material QC5 contains, for example, silicon (Si). Note that the chip core material QC5 is not limited to those containing silicon, and instead may contain other electronic materials such as sapphire and compound semiconductor materials (Groups IV, III-V, and II-VI), as long as the quantum chip QCH can use a quantum state. Further, the chip core material QC5 is preferably a single-crystal material, but may be a polycrystalline material or an amorphous material.

In the quantum device 1, the second surface QC2 of the quantum chip QCH faces the first interposer 10. The second surface QC2 of the quantum chip QCH is mounted on the first interposer 10 through the bumps BP1.

Here, an XYZ-orthogonal coordinate system is introduced for the explanation of the quantum device 1. A plane parallel to the first surface QC1 is defined as an XY-plane, and a direction orthogonal to the first surface QC1 is defined as a Z-axis direction. The Z-axis positive direction is defined as upward, and the Z-axis negative direction is defined as downward. Note that the upward and downward are merely used for the explanatory purpose, and do not necessarily indicate the directions in which the quantum device 1 is actually disposed when it is used.

The wiring layer QC4 is disposed on the second surface QC2 side of the chip core material QC5. The wiring layer QC4 contains, for example, a superconducting material such as niobium (Nb). Note that the superconducting material used for the wiring layer QC4 is not limited to niobium (Nb), and examples thereof include niobium nitrides, aluminum (Al), indium (In), lead (Pb), tin (Sn), rhenium (Re), palladium (Pd), titanium (Ti), tantalum (Ta), tantalum nitrides, and alloys containing at least one of them.

The wiring layer QC4 includes at least a part of the configuration of a qubit circuit QC6. The qubit circuit QC6 includes a resonator QC8, an oscillator QC9, a control circuit, and a readout circuit. The resonator QC8 includes a SQUID (Superconducting Quantum Interference Device) in which pieces of a superconducting material are connected to each other in a circular manner by Josephson junctions QC7. The control circuit controls a magnetic field applied to the resonator QC8. The readout circuit reads out information from the qubit circuit QC6.

For example, the wiring layer QC4 includes the resonator QC8 and the oscillator QC9 of the qubit circuit QC6. Therefore, the resonator QC8 and the oscillator QC9 are formed on the second surface QC2 of the quantum chip QCH. Meanwhile, the control circuit and the readout circuit may be disposed in the first interposer 10. Note that the wiring layer QC4 may include the control circuit and the readout circuit. The qubit circuit QC6 contains a superconducting material. The material for the Josephson junctions QC7 is preferably Al, but may be other superconducting materials. The qubit circuit QC6 is configured so as to use the resonator QC8 in a quantum state using superconductivity.

The chip core material QC5 and wiring layer QC4 are exposed in the second surface QC2 of the quantum chip QCH. The second surface QC2 preferably does not contain any dielectric material such as an insulating film. Further, the wiring layer QC4 may include a ground line. By the above-described configuration, regarding the second surface QC2 of the quantum chip QCH, in cooperation with a third surface 11 of the first interposer 10 (which will be described later), an electromagnetic field coupling may constitute a package. The package constituted of the electromagnetic field coupling is called an electromagnetic field package. In the electromagnetic field package, the resonator QC8 and the oscillator QC9, including the capacitive coupling, constitute one combined component in terms of the electromagnetic field. Further, the electromagnetic field package does not contain any dielectric material therein, and is shielded from external magnetic fields. Therefore, it has a configuration in which the power loss of the electromagnetic field inside the electromagnetic field package is minimized and the tan δ is low. As a result, it is possible to maintain the quantum coherence for a long time and thereby to improve the high frequency characteristics. Therefore, a high Q value can be achieved. In order to obtain satisfactory thermal insulation, the area (or the space) around the quantum chip QCH is preferably in a depressurized state such as a vacuum state.

The wiring layer QC4 is connected to the first interposer 10 through the first bumps BP1. Therefore, the quantum chip QCH is flip-chip mounted (i.e., mounted by using a flip-chip mounting technique) on the first interposer 10.

<First Bumps>

The first bumps BP1 may contain the above-described superconducting material. The first bumps BP1 may contain the same superconducting material as that contained in the wiring layer QC4, or may contain a superconducting material different from that contained in the wiring layer QC4. Further, in the case where each of the first bumps BP1 includes a plurality of metal layers, at least one of the surface layers preferably contains a superconducting material. Each of the first bumps BP1 may be a layered bump containing Nb (the wiring surface of the quantum chip QCH)/In (Sn, Pb and an alloy containing at least one of them)/Ti/Nb (the wiring surface of the first interposer 10)/Cu, a layered bump containing Nb (the wiring surface of the quantum chip QCH)/Nb (the wiring surface of the first interposer 10)/Cu, or a layered bump containing Nb (the wiring surface of the quantum chip QCH)/In (Sn, Pb and an alloy containing at least one of them)/Ta (the wiring surface of the first interposer 10)/Cu. Further, in the case of the first bumps BP1 containing Al and In, TiN may be used for a barrier layer in order to prevent Al and In from transforming into an alloy thereof. In such a case, each of the first bumps BP1 may be a layered bump containing Al (the wiring surface of the quantum chip QCH)/Ti/TiN/In (Sn, Pb and an alloy containing at least one of them)/TiN/Ti/Al (the wiring surface of the first interposer 10)/Cu. Note that Ti is an adhesive layer. The flip-chip connection preferably contains Nb (wiring lines of the quantum chip QCH)/In/Ti/Nb (the wiring surface of the first interposer 10)/Cu, or Nb (wiring lines of the quantum chip QCH)/Nb (the wiring surface of the first interposer 10)/Cu. The thickness of Cu in a range of 2 to 10 μm is preferably added to the thickness of 2 μm of the interposer wiring layer 13, and bumps each of which has a diameter of 100 μm are preferably provided.

<First Interposer>

Figure 3:
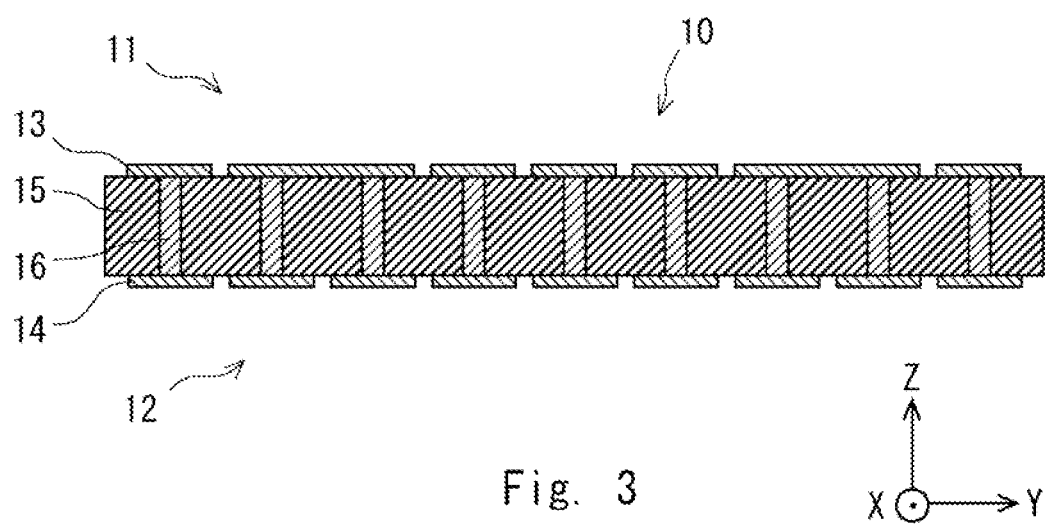
FIG. 3 is a cross-sectional diagram showing an example of a first interposer according to the first example embodiment.

FIG. 3 is a cross-sectional diagram showing an example of the first interposer 10 according to the first example embodiment. As shown in FIGS. 1 to 3, the first interposer 10 includes interposer wiring layers 13 and 14, a first core material 15, and first through vias 16 (in this specification, the term "through via" also means a conductive material with which the through via is filled). Note that, in FIG. 1, the first through vias 16 are omitted to prevent the drawing from being complicated.

The first core material 15 is, for example, a plate-like substrate. The first core material 15 has, for example, one plate surface and the other plate surface located on a side opposite to the one plate surface. The one plate surface is referred to as a third surface 11 and the other plate surface is referred to as a fourth surface 12. Therefore, the first core material 15 has plate surfaces constituting the third and fourth surfaces 11 and 12. For example, the third and fourth surfaces 11 and 12 are both rectangular. As described above, the first core material 15 and the first interposer 10 have the third and fourth surfaces 11 and 12. The first interposer 10 is connected to the quantum chip QCH so that the second surface QC2 of the quantum chip QCH is opposed to the third surface 11.

For example, the quantum chip QCH is disposed on the Z-axis direction positive side of the first interposer 10. The wiring layer QC4 disposed on the Z-axis direction negative side of the quantum chip QCH and the third surface 11 disposed on the Z-axis direction positive side of the first interposer 10 are connected to each other through the first bumps BP1.

The first core material 15 contains, for example, silicon (Si). Note that the first core material 15 is not limited to those containing silicon, and instead may contain other electronic materials such as sapphire, compound semiconductor materials (Groups IV, III-V, and II-VI), glass, ceramics, as long as the quantum chip QCH can be mounted thereon. The first core material 15 preferably contain the same material as that contained in the chip core material QC5. In this way, it is possible to make their thermal expansion coefficients equal to each other, and thereby to protect the junction between the quantum chip QCH and the first interposer 10 when they are cooled to an extremely low temperature. For example, because of the relation of the thermal expansion coefficients, the first core material 15 preferably contains the same silicon as that in the chip core material QC5. The thickness of the first core material 15 is, for example, but not limited to, 50 μm.

The interposer wiring layer 13 is formed on the third surface 11 of the first core material 15. That is, the interposer wiring layer 13 is formed on the Z-axis direction positive side of the first interposer 10. The interposer wiring layer 13 contains the above-described superconducting material. Therefore, both the second surface QC2 of the quantum chip QCH and the third surface 11 of the first core material 15 contain a superconducting material. The interposer wiring layer 13 may contain the same superconducting material as that contained in the wiring layer QC4, or may contain a superconducting material different from that contained in the wiring layer QC4. For example, the interposer wiring layer 13 preferably contains, in the order from the surface to the first core material 15, Nb (having a thickness of 0.1 μm), Cu (having a thickness of 2 μm), and Ti. The interposer wiring layer 13 is connected to the wiring layer QC4 of the quantum chip QCH through the first bumps BP1.

The interposer wiring layer 13 is preferably a single layer. For example, the interposer wiring layer 13 is preferably a single layer in which no dielectric material such as an insulating film is exposed in order to prevent the characteristics of the electromagnetic field package from deteriorating. Note that the number of layers of the interposer wiring layer 13 is preferably equal to the number of layers of the interposer wiring layer 14. That is, the interposer wiring layer 14 is also preferably a single layer. In this way, it is possible to reduce the warpage of the first interposer 10, and thereby to improve the accuracy of the alignment of the bump connection through the first bumps BP1 and the reliability thereof.

The interposer wiring layer 13 may include the control circuit 13a and the readout circuit 13b of the qubit circuit QC6. The interposer wiring layer 13 may include a part of the configuration of the qubit circuit QC6 other than the control circuit 13a and the readout circuit 13b.

The interposer wiring layer 13 may include a ground line. The ground line formed on the second surface QC2 of the quantum chip QCH may be opposed to at least a part of the ground line formed on the third surface 11 of the first interposer 10. In this way, it is possible to form an electromagnetic shield surrounded by the ground line between the second surface QC2 and the third surface 11.

When the part of the third surface 11 that is opposed to the second surface QC2 is viewed from above, this opposed part is occupied by the interposer wiring layer 13 and the first core material 15. That is, the interposer wiring layer 13 and the first core material 15 are exposed in the opposed part, and no insulating layer is exposed therein. The second surface QC2 is occupied by the wiring layer QC4 and the chip core material QC5. That is, the wiring layer QC4 and the chip core material QC5 are exposed in the second surface QC2, and no insulating layer is exposed therein. In this way, in the quantum device 1, the above-described electromagnetic field package is formed between the opposed part and the second surface QC2.

The interposer wiring layer 14 is formed on the fourth surface 12 of the first core material 15. That is, the interposer wiring layer 14 is formed on the Z-axis direction negative side of the first interposer 10. The interposer wiring layer 14 may contain the above-described superconducting material, or may contain a normal conductive material. In the case the interposer wiring layer 14 contains a superconducting material, it may contain the same superconducting material as that contained in the wiring layer QC4 and the interposer wiring layer 13, or may contain a superconducting material different from that contained in the wiring layer QC4 and the interposer wiring layer 13. In the case where the interposer wiring layer 14 contains a normal conductive material, it may contain, for example, copper (Cu), silver (Ag), gold (Au), platinum (Pt), or an alloy containing at least one of them. For example, the interposer wiring layer 14 preferably contains, in the order from the surface to the first core material 15, Cu and Ti.

The interposer wiring layer 14 is preferably a single layer. Note that, as described above, the number of layers of the interposer wiring layer 14 is preferably equal to the number of layers of the interposer wiring layer 13 in order to reduce the warpage. That is, each of the interposer wiring layers 13 and 14 is preferably a single layer. The interposer wiring layer 14 may include terminals 14a. Although only one terminal 14a is shown in the drawing to prevent the drawing from being complicated, a plurality of terminals 14a may be provided.

Each of the first through vias 16 penetrates (i.e., extends through) the first core material 15 from the third surface 11 side to the fourth surface 12 side. A plurality of first through vias 16 are provided. The plurality of first through vias 16 connect the interposer wiring layer 13 to the interposer wiring layer 14. When the first core material 15 contains silicon, the first through vias 16 are TSVs (Through Silicon Vias). A larger number of first through vias 16 than a predetermined number may be provided, and the same applies to second through vias 26 (which will be described later). A larger number of first through vias 16 than the predetermined number may be provided so that the resonance frequency generated by the capacitor structure composed of the circuits on the third and fourth surfaces 11 and 12 of the first interposer, especially the circuits opposed to each other in the XY-plane, becomes higher than the signal frequency. For example, a large number of first through vias 16 may be provided so that the aforementioned resonance frequency becomes higher than 20 GHz. For example, when the first core material 15 contains silicon, it is possible to make the aforementioned resonance frequency higher than 20 GHz by adjusting the interval between adjacent first through vias 16 to 1 mm or shorter.

The first through vias 16 may contain the above-described superconducting material, or may contain the above-described normal conductive material. In the case where the first through vias 16 contain a superconducting material, they may contain the same superconducting material as that contained in the wiring layer QC4 and the like, or may contain a superconducting material different from that contained in the wiring layer QC4 and the like. Further, in the case where the first through vias 16 contain a normal conductive material, they may include the same normal conductive material as that contained in the interposer wiring layer 14, or may contain a normal conductive material different from that contained in the interposer wiring layer 14. For example, the first through vias 16 may be those that are formed by forming $SiO_2$ (e.g., a thermal oxide film) on the sidewalls of through holes and filling them with Cu while using Ti as an adhesive layer. Note that the diameter and the material of the first through vias 16 are not limited to the above-described examples.

The diameter of each of the first through vias 16 is preferably smaller than that of each of second through vias 26 (which will be described later). For example, the diameter of each of the first through vias 16 is 10 to 15 μm. By adjusting the diameter of each of the first through vias 16 to 10 to 15 μm, the coupling capacitance can be reduced, thus making it possible to reduce the influence on the operation of the readout circuit 13b. Further, qubit circuits QC6 can be packed at a high density. Note that the diameter of the first through vias 16 is not limited to the above-described example. Further, the pitch at which the first through vias 16 are arranged in the XY-plane is preferably shorter than the pitch of the second through vias 26. In this way, qubit circuits QC6 can be packed at a high density.

The interposer wiring layer 14 is connected to the second interposer 20 through the second bumps BP2. Therefore, the first interposer 10 is mounted on the second interposer 20.

<Second Bumps>

The second bumps BP2 may contain the above-described superconducting material, or may contain above-described normal conductive material. In the case where the second bumps BP2 contain a superconducting material, they may contain the same superconducting material as that contained in the wiring layer QC4 and the like, or may contain a superconducting material different from that contained in the wiring layer QC4. Further, in the case where the second bumps BP2 contain a normal conductive material, they may contain the same normal conductive material as that contained in the interposer wiring layer 14, or may contain a normal conductive material different from that contained in the interposer wiring layer 14. Underfill may be provided in the connection part of each of the second bumps BP2.

<Second Interposer>

Figure 4:
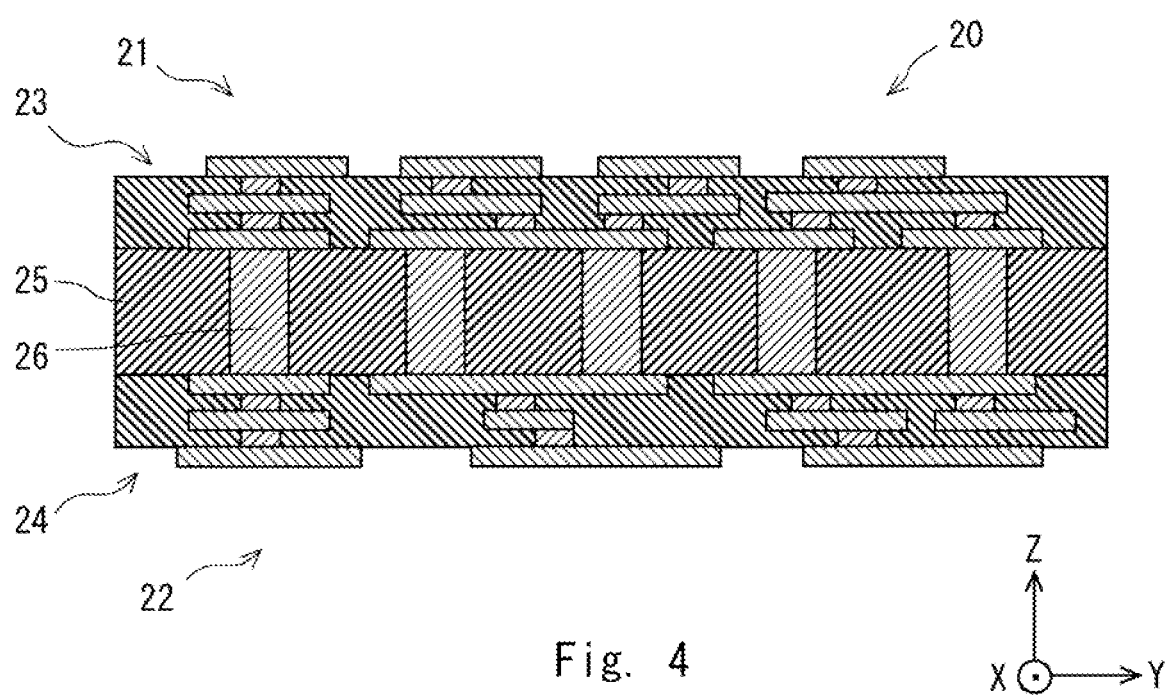
FIG. 4 is a cross-sectional diagram showing an example of a second interposer according to the first example embodiment.

FIG. 4 is a cross-sectional diagram showing an example of the second interposer 20 according to the first example embodiment. As shown in FIGS. 1 and 4, the second interposer 20 includes interposer wiring layers 23 and 24, a second core material 25, and second through vias 26. Note that, in FIG. 1, the second through vias 26 are omitted to prevent the drawing from being complicated. In FIG. 2, the second interposer 20 is omitted.

The second core material 25 is, for example, a plate-like substrate. The second core material 25 has, for example, one plate surface and the other plate surface located on a side opposite to the one plate surface. The one plate surface is referred to as a fifth surface 21 and the other plate surface is referred to as a sixth surface 22. Therefore, the second core material 25 has plate surfaces constituting the fifth and sixth surfaces 21 and 22. For example, the fifth and sixth surfaces 21 and 22 are both rectangular. As described above, the second core material 25 and the second interposer 20 have the fifth and sixth surfaces 21 and 22. The second interposer 20 is connected to the first interposer 10 so that the fourth surface 12 of the first interposer 10 is opposed to the fifth surface 21.

For example, the first interposer 10 is disposed on the Z-axis direction positive side of the second interposer 20. The interposer wiring layer 14 disposed on the Z-axis direction negative side of the first interposer 10 and the interposer wiring layer 23 disposed on the Z-axis direction positive side of the second interposer 20 are connected to each other through the second bumps BP2.

The second core material 25 contains, for example, silicon (Si). Note that the second core material 25 is not limited to those containing silicon, and instead may contain other electronic materials such as sapphire, compound semiconductor materials (Groups IV, III-V, and II-VI), glass, ceramics, as long as the first interposer 10 can be mounted thereon. The first core material 15 preferably contains the same material as that contained in the second core material 25. In this way, it is possible to make their thermal expansion coefficients equal to each other, and thereby to protect the junction between the first and second interposers 10 and 20 when they are cooled to an extremely low temperature. Further, the chip core material QC5 preferably contains the same material as that contained in the second core material 25. It is possible to protect the junction part from the quantum chip QCH to the second interposer 20 when they are cooled to an extremely low temperature. For example, because of the relation of the thermal expansion coefficients, the second core material 25 preferably contains the same silicon as that in the chip core material QC5. The thickness of the second core material 25 is, for example, 200 μm. In this way, it is possible to stabilize the ground potential and thereby to stabilize the cooling function. Note that the thickness of the second core material 25 is not limited to the above-described example.

The interposer wiring layer 23 is formed on the fifth surface 21 of the second core material 25. That is, the interposer wiring layer 23 is formed on the Z-axis direction positive side of the second interposer 20. The interposer wiring layer 23 preferably contains a normal conductive material, but it does not mean that the interposer wiring layer 23 contains no superconducting material. Examples of the normal conductive material include copper (Cu), silver (Ag), gold (Au), platinum (Pt), and alloys containing at least one of them. For example, the interposer wiring layer 14 preferably contains, in the order from the surface to the first core material 15, Cu and Ti.

The interposer wiring layer 23 may be a single layer or may be composed of multiple layers. However, the interposer wiring layer 23 preferably has a multi-layered wiring structure including an insulating layer(s) and a wiring layer (s). Note that the number of stacked layers of the interposer wiring layer 23 is preferably equal to the number of stacked layers of the interposer wiring layer 24. In this way, it is possible to reduce the warpage of the second interposer 20, and thereby to improve the accuracy of the alignment of the bump connection through the second bumps BP2 and the reliability thereof.

For example, it is preferred that, in the interposer wiring layer 23, a coplanar (a first layer), a microstrip line (a second layer), and a strip line (a third layer) are formed with insulating layers interposed therebetween. In particular, the interposer wiring layer 23 has three or more layers in which a strip line, which has excellent high-frequency characteristics, can be formed. Further, in the thickness direction, the interposer wiring layer 23 preferably has three or more layers in which a ground wiring layer, a signal wiring layer, and another ground wiring layer are stacked in this order with insulating layers interposed therebetween.

The interposer wiring layer 24 is formed on the sixth surface 22 of the second core material 25. That is, the interposer wiring layer 24 is formed on the Z-axis direction negative side of the second interposer 20. The interposer wiring layer 24 preferably contains a normal conductive material, but it does not mean that the interposer wiring layer 24 contains no superconducting material. The interposer wiring layer 24 may contain the same normal conductive material as that contained in the interposer wiring layer 23, or may contain a normal conductive material different from that contained in the interposer wiring layer 23.

The interposer wiring layer 24 may be a single layer or may be composed of multiple layers. However, the interposer wiring layer 24 preferably has a multi-layered wiring structure including an insulating layer(s) and a wiring layer (s). Further, as described above, the number of stacked layers of the interposer wiring layer 24 is preferably equal to the number of stacked layers of the interposer wiring layer 23 in order to reduce the warpage.

The interposer wiring layer 24 is preferably provided with a routing wiring structure that does not deteriorate signals having high frequencies (10 GHz, 200 GHz, etc.). For example, it is preferred that, in the interposer wiring layer 24, a coplanar (a first layer), a microstrip line (a second layer), and a strip line (a third layer) are formed with insulating layers interposed therebetween. In particular, the interposer wiring layer 24 has three or more layers in which a strip line, which has excellent high-frequency characteristics, can be formed. Further, in the thickness direction, the interposer wiring layer 24 preferably has three or more layers in which a ground wiring layer, a signal wiring layer, and another ground wiring layer are stacked in this order with insulating layers interposed therebetween.

The interposer wiring layer 24 may be connected to a socket or the like. In this case, the interposer wiring layer 24 is configured so that its electrical connection conforms to that of the socket or the like. For example, it is configured so that gold (Au), copper (Cu), and soldering can be used on the connection surface, and terminals of which the pitch of the electrical contacts is 0.3 mm or longer may be provided.

Each of the second through vias 26 penetrates (i.e., extends through) the second core material 25 from the fifth surface 21 side to the sixth surface 22 side. A plurality of second through vias 26 are provided. The plurality of second through vias 26 connect the interposer wiring layer 23 to the interposer wiring layer 24. When the second core material 25 contains silicon, the second through vias 26 are TSVs (Through Silicon Vias). Similarly to the first through vias 16, a larger number of second through vias 26 than a predetermined number may be provided so that the resonance frequency generated by the capacitor structure composed of the circuits on the fifth and sixth surfaces 21 and 22 of the second interposer, especially the circuits opposed to each other in the XY-plane, becomes higher than the signal frequency. For example, a large number of second through vias 26 than the predetermined number may be provided so that the aforementioned resonance frequency becomes higher than 20 GHz.

The second through vias 26 preferably contain a normal conductive material, but it does not mean that the second through vias 26 contain no superconducting material. The second through vias 26 may contain the above-described normal conductive material. The second through vias 26 may contain the same normal conductive material as that contained in the interposer wiring layers 23 and 24 and the like, or may contain a normal conductive material different from that contained in the interposer wiring layers 23 and 24 and the like. For example, the second through vias 26 are those that are formed by forming $SiO_2$ (e.g., a thermal oxide film) on the sidewalls of through holes and filling them with Cu while using Ti as an adhesive layer.

The diameter of each of the second through vias 26 may be larger than that of each of the first through vias 16. For example, the diameter of each of the second through vias 26 is preferably larger than that of each of the first through vias 16 in order to increase the number of electrons that can be transferred to stabilize the potential of the ground circuit. For example, the diameter of each of the second through vias 26 is preferably larger than that of each of the first through vias 16 in order to increase the heat capacity and improve the dissipation (or the radiation) of heat and/or the cooling performance. For example, the diameter of each of the second through vias 26 is 50 to 100 μm. Further, the pitch at which the second through vias 26 are arranged may be larger than the pitch at which the first through vias 16 are arranged.

Regarding the external shapes of the quantum chip QCH and the first interposer 10 as viewed from above, the size of the quantum chip QCH may be smaller than that of the first interposer 10, or they have the same size as each other. Alternatively, the size of the first interposer 10 may be smaller than that of the quantum chip QCH. In the case of the same size, for example, after the WoW (Wafer on Wafer) in which the quantum chip QCH is connected on the first interposer 10, they may be cut. Further, regarding the external shapes of the first and second interposers 10 and 20 as viewed from above, the size of the first interposer 10 may be smaller than that of the second interposer 20, or they have the same size as each other. Alternatively, the size of the second interposer 20 may be smaller than that of the first interposer 10. In the case of the same size, for example, after the WoW in which the second interposer 20 is connected on the first interposer 10, they may be cut.

In the case where the external shape of the first interposer 10 is larger than that of the quantum chip QCH, terminals for a check circuit and the like may be provided in a part of the third surface 11, on which the quantum chip QCH is mounted, that is not shielded by the quantum chip QCH.

In the quantum device 1 according to this example embodiment, the qubit circuit QC6 is formed between the second surface QC2 of the quantum chip QCH and the third surface 11 opposed to the quantum chip QCH. Further, the second interposer 20 is stacked on the fourth surface side of the first interposer 10. In this way, it is possible to improve the coherence while increasing the number of terminals.

No insulating layer containing $SiO_2$, SiN, an organic material, or the like is exposed in the second surface QC2 and the part of the third surface 11 that is opposed to the quantum chip QCH. Therefore, the coherence can be further improved. Further, even when the fifth and sixth surfaces 21 and 22 of the second interposer 20 include an insulating layer, its influence on the electromagnetic field package is small. Therefore, it is possible to form the interposer wiring layers 23 and 24 of the second interposer 20 in the form of multi-layered wiring layers. As a result, it is possible to form a circuit in which high-frequency characteristics are taken into consideration, and to increase the number of terminals at the same time.

Second Example Embodiment

Next, a quantum device according to a second example embodiment will be described. The quantum device according to this example embodiment is disposed on a sample table having a cooling function.

Figure 5:
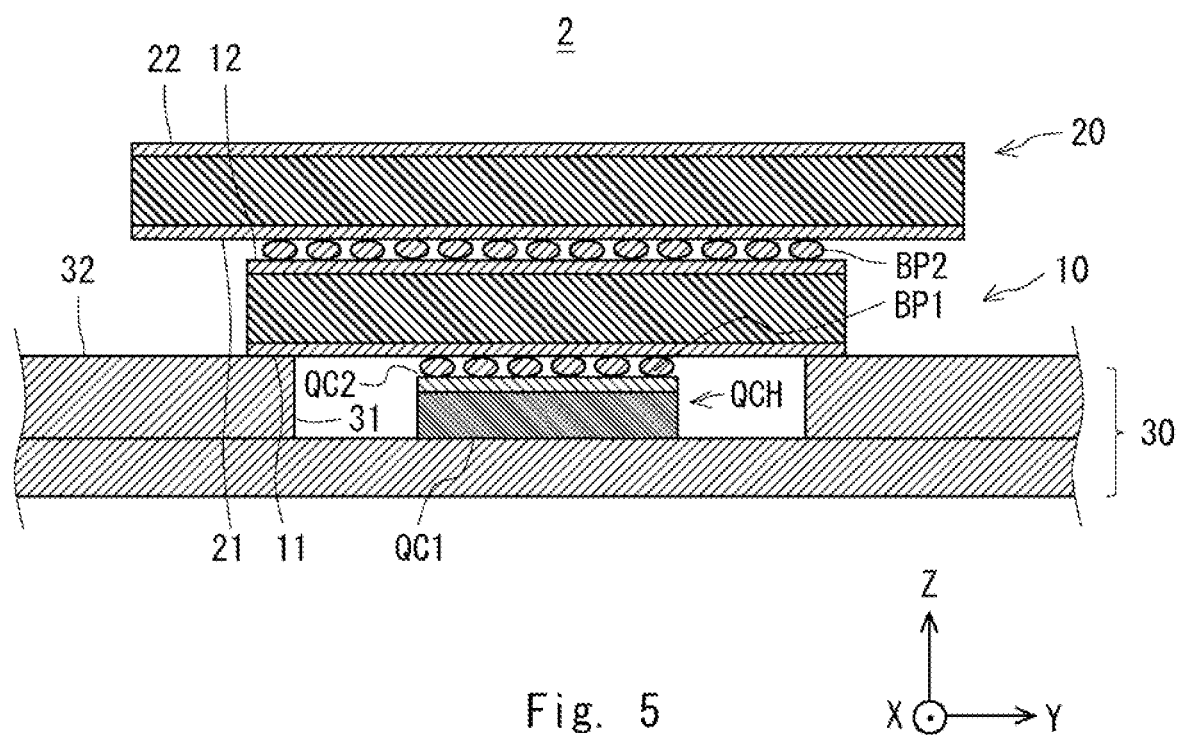
FIG. 5 is a cross-sectional diagram showing an example of a quantum device according to a second example embodiment.

FIG. 5 shows a cross-sectional diagram of the quantum device according to the second example embodiment. As shown in FIG. 5, the quantum device 2 according to this example embodiment is disposed on a sample table 30. Similarly to the quantum device 1, the quantum device 2 includes a quantum chip QCH, a first interposer 10, a second interposer 20, first bumps BP1, and second bumps BP2. Note that some reference numerals (or symbols) are omitted to prevent the drawing from being complicated. Further, although an XYZ-orthogonal coordinate system is also introduced for the explanation of the quantum device 2 in the second example embodiment, the direction of the Z-axis, which is orthogonal to the first surface QC1, is different from that in FIG. 1. That is, the direction from the quantum chip QCH toward the first interposer 10 is defined as the Z-axis positive direction.

The sample table 30 has a cooling function. For example, the sample table 30 is a cold stage that can be cooled to an extreme temperature of about 10 [mK] by a refrigerator. For example, the sample table 30 preferably contains a metal(s) such as Cu, a Cu alloy, Al, and the like. In the case where the sample table 30 contains Al, it may be electrically insulated through an anodizing process. For example, the quantum device 2 according to this example embodiment uses, when Nb is contained as a superconducting material for the quantum chip QCH, a superconducting phenomenon at an extremely low temperature of 9.2 [K] or lower, and uses, when Al is contained, a superconducting phenomenon at an extremely low temperature of 1.2 [K] or lower. Therefore, the sample table 30 that can be cooled to such an extreme temperature is used.

A recessed part 31 is formed in the sample table 30. For example, the recessed part 31 is formed in a predetermined surface 32 of the sample table 30. The predetermined surface 32 is, for example, an upper surface facing the Z-axis positive direction. The recessed part 31 is opened toward the Z-axis positive direction. As viewed from above, the recessed part 31 is, for example, rectangular.

As viewed from above through the first and second interposers 10 and 20 (e.g., as viewed above in a state where the first and second interposers 10 and 20 are not disposed), the quantum chip QCH is smaller than the recessed part 31. Meanwhile, the first interposer 10 is larger than the recessed part 31 as viewed from above. The quantum chip QCH is disposed inside the recessed part 31 formed in the sample table 30 having the cooling function. Meanwhile, a part of the first interposer 10 is in contact with the sample table 30. For example, a part of the third surface 11 on which the quantum chip QCH of the first interposer 10 is mounted is in contact with the upper surface of the sample table 30.

In order to prevent electrical conduction between the third surface 11 of the first interposer 10 and the sample table 30, an insulating film may be formed on the part of the third surface 11 that is in contact with the sample table 30, or an insulating spacer(s) may be disposed thereon. Further, the interposer wiring layer 13 may not be formed on the part of the third surface 11 that is in contact with the sample table 30.

By disposing the first interposer 10 so that at least a part thereof is in contact with the sample table 30, the qubit circuit QC6 in the quantum chip QCH can be cooled to an extremely low temperature by using the first interposer 10 as a heat flowing path, so that a superconductivity phenomenon can be used. Further, by disposing the quantum chip QCH so that the first surface QC1 thereof is in contact with the inner surface of the recessed part 31, the cooling performance can be further improved. In order to improve the thermal insulation by which the temperature change around the quantum chip QCH is reduced, it is preferred to bring the area (or the space) around the quantum chip QCH into a vacuum state or a depressurized state.

Further, by disposing the quantum chip QCH so that the first surface QC1 thereof is movably in contact with the inner surface of the recessed part 31, it is possible to suppress the stress and the strain which would otherwise be caused by the difference between the contraction of the quantum chip QCH and that of the sample table 30 caused by the change of the temperature to an extremely low temperature.

Since at least a part of the first interposer 10 is in contact with the sample table 30, the quantum chip QCH can be cooled by the thermal conduction of the sample table 30 through the first interposer 10, so that the cooling performance can be improved.

By connecting the fourth surface 12 of the first interposer 10 to the second interposer 20, it is possible to make the best use of the fourth surface 12 in order to provide terminals for obtaining (i.e., outputting) information from the quantum chip QCH. Therefore, it is possible to increase the number of terminals for obtaining (i.e., outputting) information from the quantum chip QCH.

First Modified Example

Figure 6:
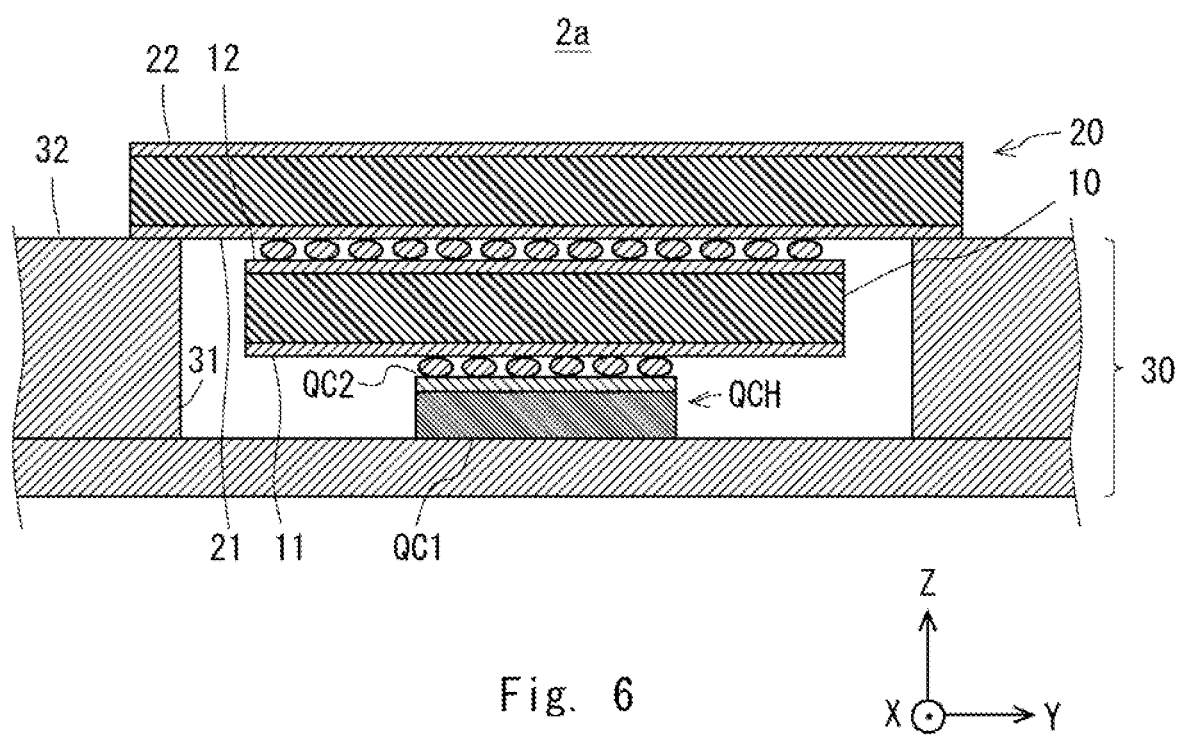
FIG. 6 is a cross-sectional diagram showing an example of a quantum device according to a first modified example of the second example embodiment.

Next, a first modified example of the second example embodiment will be described. This modified example is an example in which the first interposer 10 is also disposed inside the recessed part 31. FIG. 6 is a cross-sectional diagram showing an example of a quantum device according to the first modified example of the second example embodiment. As shown in FIG. 6, in the quantum device 2a, the first interposer 10 is disposed inside the recessed part 31, and a part of the fifth surface 21 of the second interposer 20 is in contact with the upper surface of the sample table 30.

In order to prevent electrical conduction between the fifth surface 21 of the second interposer 20 and the sample table 30, an insulating film may be formed on the part of the fifth surface 21 that is in contact with the sample table 30, or an insulating spacer(s) may be disposed thereon. Further, the interposer wiring layer 23 may not be formed on the part of the fifth surface 21 that is in contact with the sample table 30.

By disposing the second interposer 20 so that at least a part thereof is in contact with the sample table 30, the qubit circuit QC6 in the quantum chip QCH can be cooled to an extremely low temperature by using the second interposer 20 as a heat flowing path, so that a superconductivity phenomenon can be used.

Second Modified Example

Figure 7:
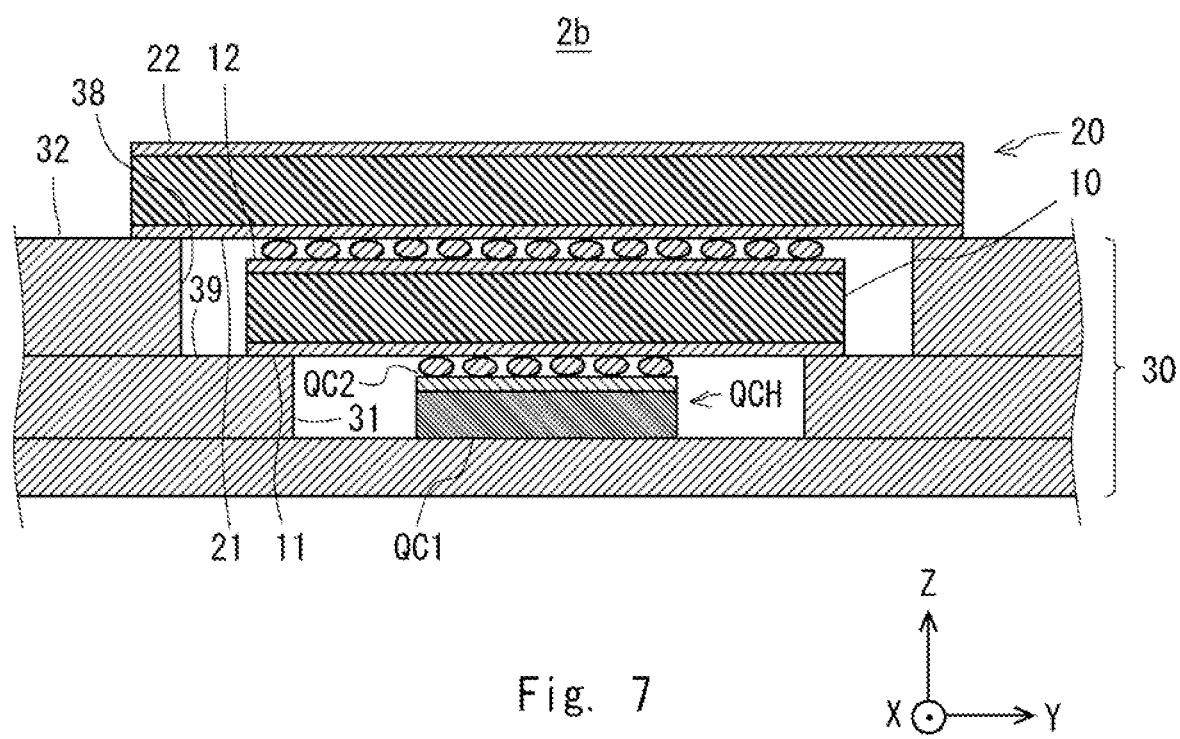
FIG. 7 is a cross-sectional diagram showing an example of a quantum device according to a second modified example of the second example embodiment.
Figure 8:
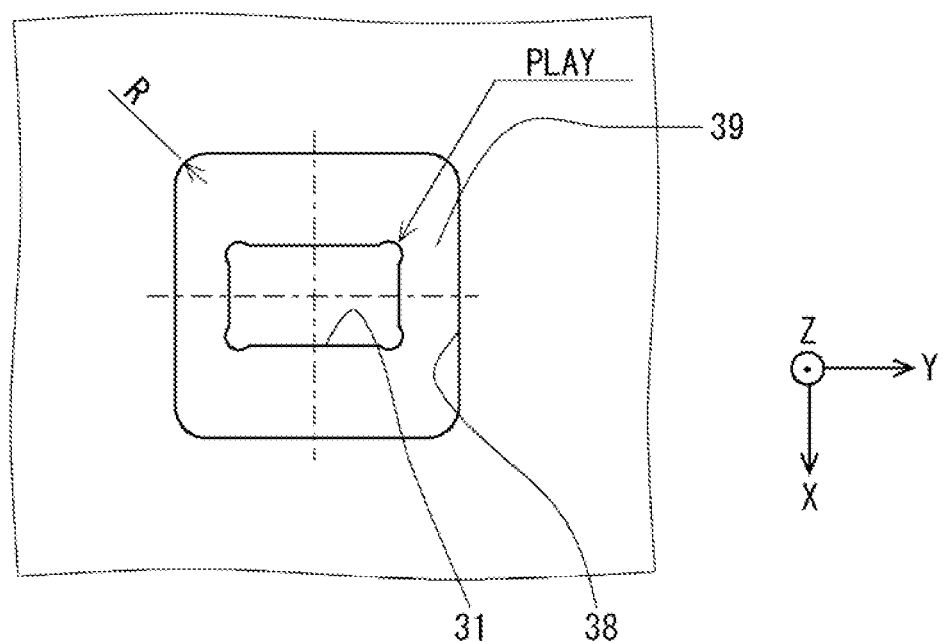
FIG. 8 is a plan view showing an example of a recessed part and a counter sunk of a sample table according to a second modified example of the second example embodiment.

Next, a second modified example of the second example embodiment will be described. In this modified example, a countersunk hole is formed in the recessed part 31. FIG. 7 is a cross-sectional diagram showing an example of a quantum device according to the second modified example of the second example embodiment. FIG. 8 is a plan view showing an example of the recessed part 31 and the countersunk hole 38 in the sample table 30 according to the second modified example of the second example embodiment. As shown in FIGS. 7 and 8, in the quantum device 2b, the recessed part 31 of the sample table 30 is formed in a predetermined surface 32 of the sample table 30. Further, the countersunk hole 38 is formed around the mouth of the recessed part 31. As a result, a stepped surface 39 having a step (i.e., a difference in level) with respect to the predetermined surface 32 is formed around the mouth of the recessed part 31. Therefore, the countersunk hole 38 includes the stepped surface 39.

The stepped surface 39 is, for example, parallel to the predetermined surface 32. The stepped surface 39 is formed around the recessed part 31. The stepped surface 39 surrounds the recessed part 31. The quantum chip QCH is disposed inside the recessed part 31. A part of the third surface 11 of the first interposer 10 is in contact with the stepped surface 39. A part of the fifth surface 21 of the second interposer 20 is in contact with the predetermined surface 32.

In order to prevent electrical conduction between the third surface 11 of the first interposer 10 and the stepped surface 39, an insulating film may be formed on the part of the third surface 11 that is in contact with the stepped surface 39. Further, the interposer wiring layer 13 may not be formed on the part of the third surface 11 that is in contact with the stepped surface 39.

In order to prevent electrical conduction between the fifth surface 21 of the second interposer 20 and the predetermined surface 32, an insulating film may be formed on the part of the fifth surface 21 that is in contact with the predetermined surface 32. Further, the interposer wiring layer 23 may not be formed on the part of the fifth surface 21 that is in contact with the predetermined surface 32.

As shown in FIG. 8, the recessed part 31 may include a space on each of the four sides so that the quantum chip QCH can be disposed. Further, the recessed part 31 may have such a shape that R or a circle is added at each of the four corners. As a result, it is possible to suppress the occurrence of a stress or a strain which would otherwise occur due to the volume change when the quantum device is cooled to an extremely low temperature. In particular, it is possible to prevent stress from being concentrated at each of the four corners which would otherwise be caused due to the right-angle shape or an acute-angle shape.

In the quantum device 2b according to this modified example, since the first interposer 10 is disposed inside the countersunk hole 38, the first interposer 10 is surrounded by the sample table 30. Therefore, the cooling performance can be improved. Further, the parts of the first and second interposers 10 and 20 are in contact with the sample table 30, and this feature can further improve the cooling performance.

Third Modified Example

Figure 9:
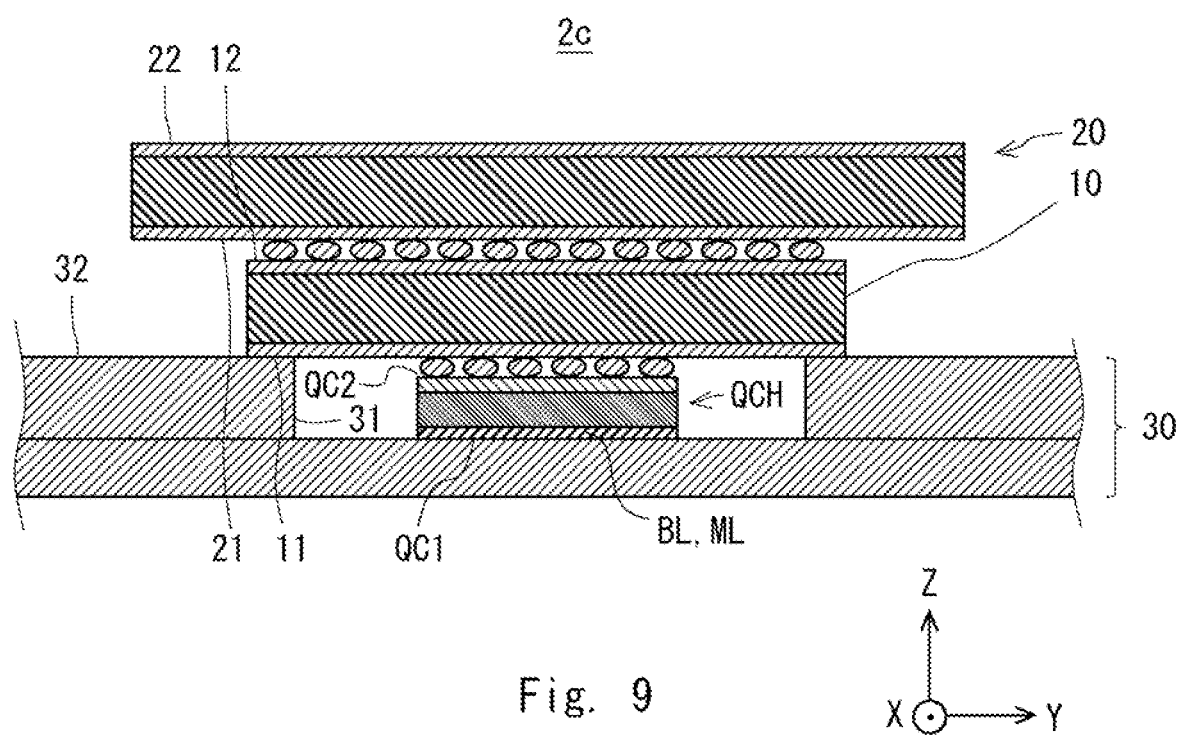
FIG. 9 is a cross-sectional diagram showing an example of a quantum device according to a third modified example of the second example embodiment.

Next, a third modified example of the second example embodiment will be described. This modified example includes a bonding layer or a joint layer between the quantum chip QCH and the inner surface of the recessed part 31. FIG. 9 is a cross-sectional diagram showing an example of a quantum device according to the third modified example of the second example embodiment. As shown in FIG. 9, in the quantum device 2c according to the third modified example, at least a part of the first surface QC1 of the quantum chip QCH may be bonded or joined to the inner surface of the recessed part 31. For example, the first surface QC1 may be bonded to the sample table 30 by a bonding layer BL such as a varnish layer or a grease layer. Further, the first surface QC1 may be joined to the sample table 30 by a joint layer ML, such as a metal layer, formed between the chip core material QC5 and the sample table 30. By the above-described configuration, it is possible to improve the stability of the mounting of the quantum chip QCH and thereby to improve the accuracy of the position thereof. Further, the thermal connection with the sample table 30 can be improved.

The bonding layer BL or the joint layer ML may be disposed over the entire surface of the first surface QC1, or may be disposed on at least a part of the first surface QC1, such as the peripheral part of the first surface QC1 or the center of the first surface QC1. For example, the bonding layer BL or the joint layer ML may be formed so as to avoid the area where the qubit circuit QC6 is formed as viewed from above. When the bonding layer BL is made of an insulating material, it is conceivable that the bonding layer BL may act as a capacitor and resonate with the qubit circuit QC6, and hence cause an energy loss as a whole. By disposing the bonding layer BL so as to avoid the area where the qubit circuit QC6 is formed, the resonance can be suppressed.

Further, when the joint layer ML is conductive, e.g., is a metal layer, the ground potential of the quantum chip QCH may be obtained from the sample table 30 through the joint layer ML, or the potential defined (i.e., used) in the sample table 30 may be obtained.

Fourth Modified Example

Figure 10:
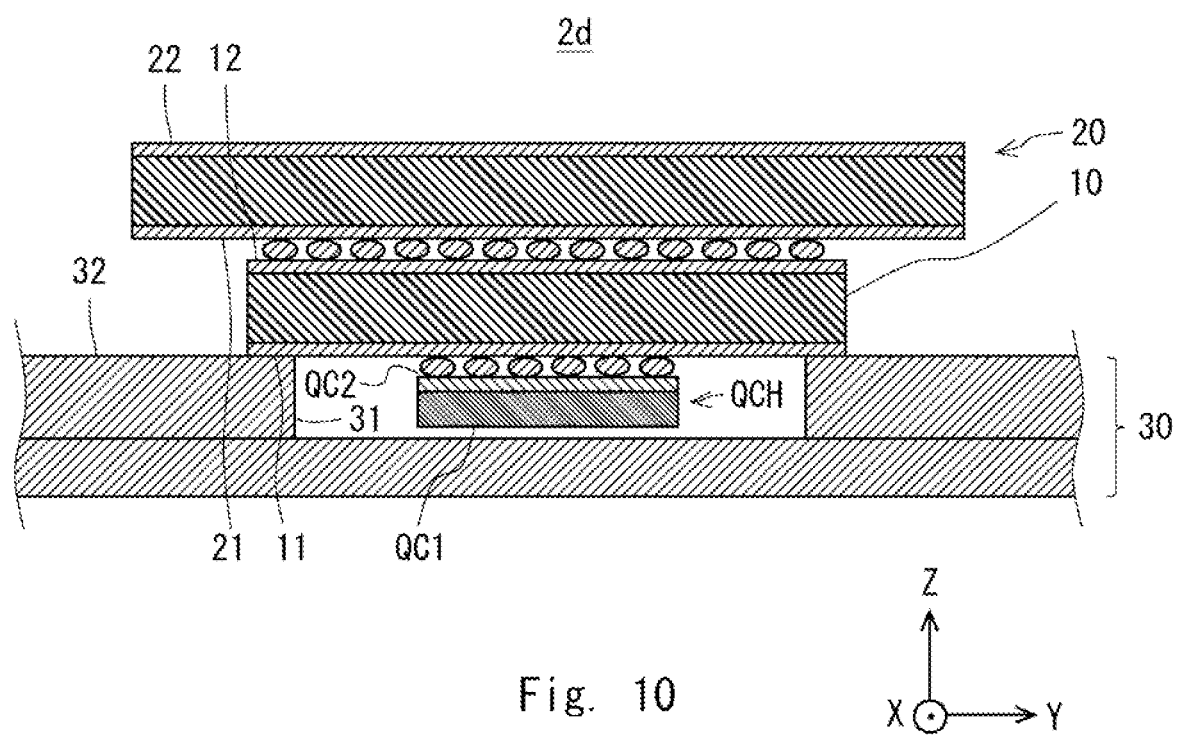
FIG. 10 is a cross-sectional diagram showing an example of a quantum device according to a fourth modified example of the second example embodiment.

Next, a fourth modified example of the second example embodiment will be described. In this modified example, there is a space between the quantum chip QCH and the inner surface of the recessed part 31. FIG. 10 is a cross-sectional diagram showing an example of a quantum device according to the fourth modified example of the second example embodiment. As shown in FIG. 10, in the quantum device 2d according to the fourth modified example, the quantum chip QCH may not be in contact with the sample table 30. That is, the first surface QC1 of the quantum chip QCH may be disposed with a space interposed between the first surface QC1 and the inner surface of the recessed part 31 of the sample table 30. By the above-described configuration, it is possible to suppress the stress and the strain which would otherwise be caused by the difference between the contraction of the quantum chip QCH and that of the sample table 30 caused by the change of the temperature to an extremely low temperature.

Fifth Modified Example

Figure 11:
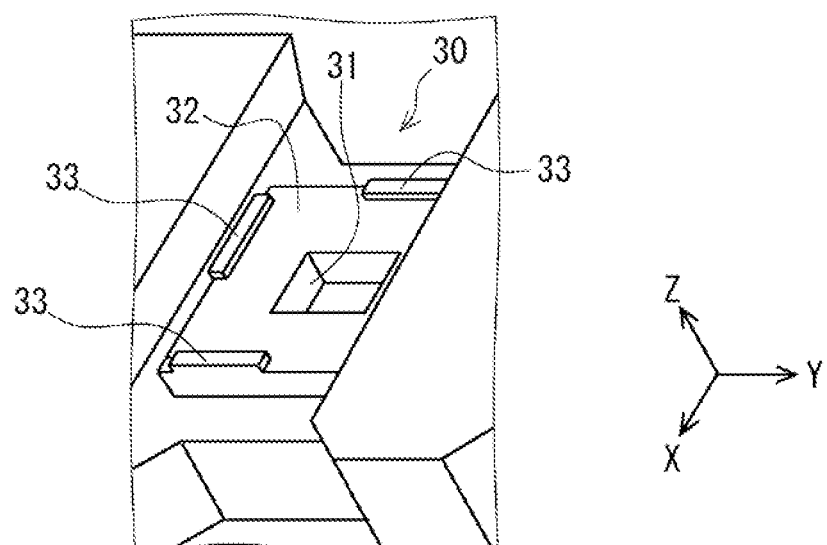
FIG. 11 is a perspective view showing an example of a recessed part and holding members of a sample table according to a fifth modified example of the second example embodiment.
Figure 12:
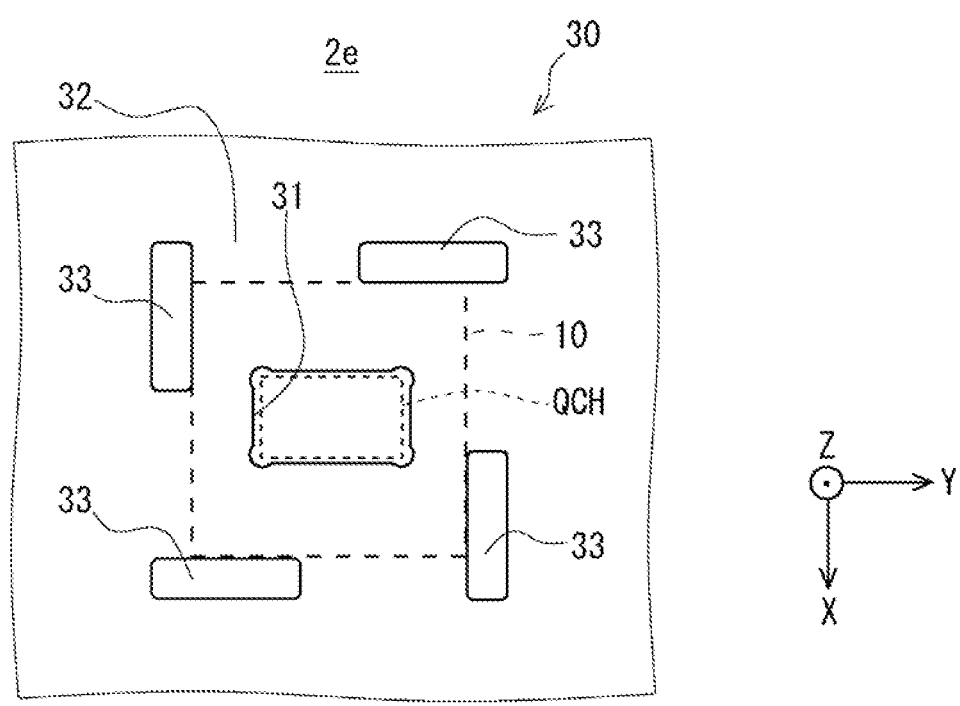
FIG. 12 is a plan view showing the example of the recessed part and the holding members of the sample table according to the fifth modified example of the second example embodiment.

Next, a fifth modified example of the second example embodiment will be described. This modified example includes holding members (or pressing members) on a predetermined surface 32 of the sample table 30. FIG. 11 is a perspective view showing an example of the recessed part 31 and the holding members in the sample table 30 according to the fifth modified example of the second example embodiment. FIG. 12 is a plan view showing the example of the recessed part 31 and the holding members in the sample table 30 according to the fifth modified example of the second example embodiment. As shown in FIGS. 11 and 12, in the quantum device 2e according to the fifth modified example, the recessed part 31 is formed in a predetermined surface 32 of the sample table 30, e.g., on the upper surface of the sample table 30. Further, a plurality of holding members 33 are provided on the predetermined surface 32 around the recessed part 31. For example, four holding members 33 are provided on the predetermined surface 32.

At least a part of the side surface of the first interposer 10 is in contact with the holding members 33 provided on the predetermined surface 32. For example, in the case where the first interposer 10 is rectangular as viewed from above, each of the plurality of holding members 33 holds (or presses) the side surface of the first interposer 10 near a respective one of the corners thereof with its planar part. By the above-described configuration, the plurality of holding members 33 can hold, with their planar parts, the side surface of the first interposer 10 at the diagonal corner parts thereof in a non-continuous manner. Therefore, when the first interposer 10 or the holding members 33 contract at a low temperature, they can slide (i.e., move) in a straight line and thereby enable themselves to contract uniformly. Note that, in the case where the second interposer 20 is in contact with the predetermined surface 32, the plurality of holding members 33 may hold (or press) the side surface of the second interposer 20. Further, in the case where the first interposer 10 is in contact with the stepped surface 39 of the countersunk hole 38, the holding members 33 may be disposed on the stepped surface 39.

Sixth Modified Example

Figure 13:
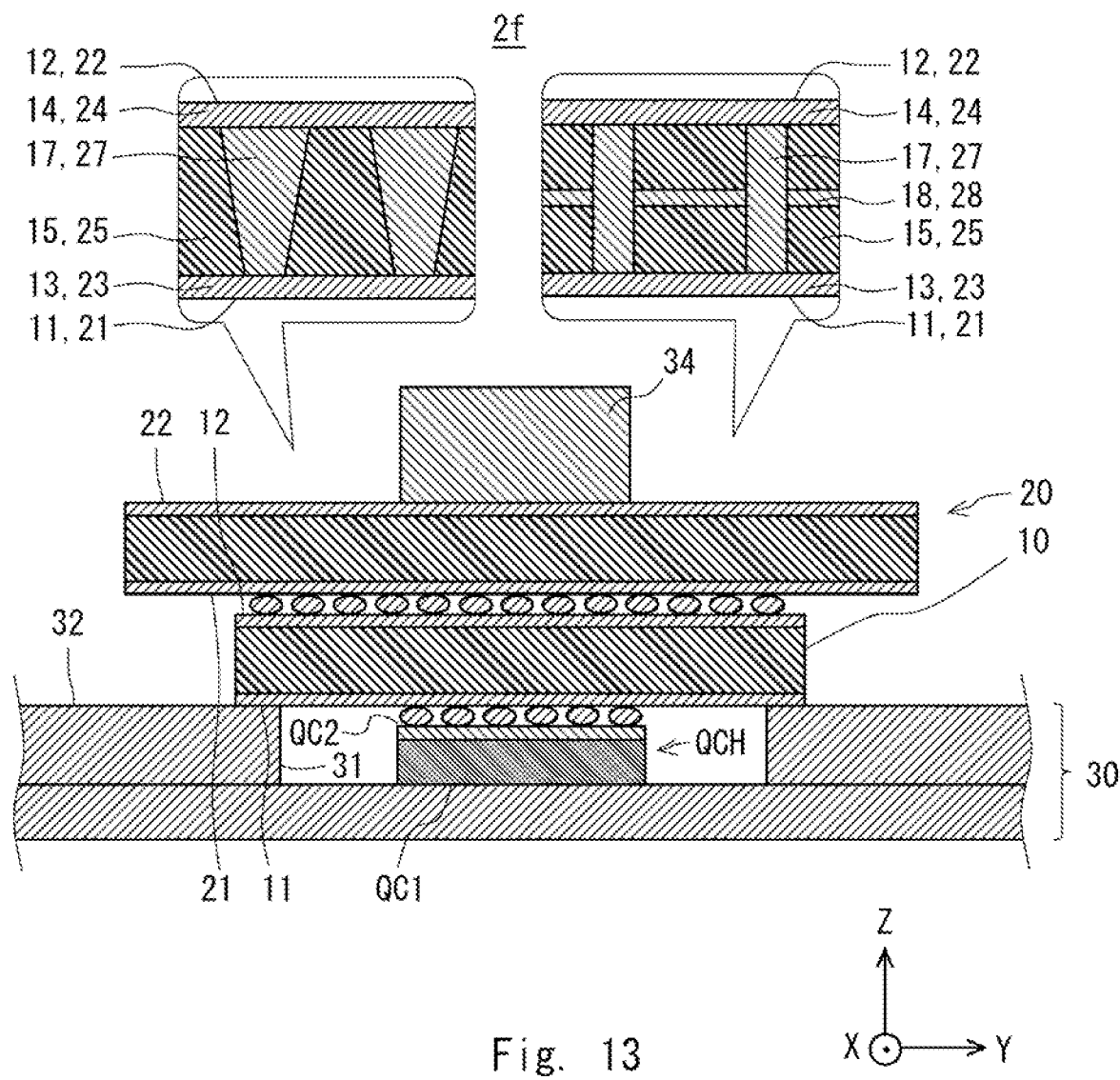
FIG. 13 is a cross-sectional diagram showing an example of a quantum device according to a sixth modified example of the second example embodiment.

Next, a sixth modified example of the second example embodiment will be described. This modified example includes a cooling member on the sixth surface 22 of the second interposer 20, and also includes thermal vias inside the first and second interposers 10 and 20. FIG. 13 is a cross-sectional diagram showing an example of a quantum device according to the sixth modified example of the second example embodiment. In FIG. 13, the first through vias 16 of the first interposer 10 and the second through vias 26 of the second interposer 20 are omitted to prevent the drawing from being complicated. As shown in FIG. 13, in the quantum device 2f according to the sixth modified example, the sixth surface 22 of the second interposer 20 may be in contact with a cooling member 34. The cooling member 34 has a cooling function. For example, the cooling member 34 may function as a cooling member as it is connected to the sample table 30. By the above-described configuration, the sixth surface 22 of the second interposer 20 can be cooled by the thermal conduction of the cooling member 34, so that the cooling performance can be improved.

Further, the first interposer 10 may include thermal vias 17, and the second interposer 20 may include thermal vias 27. The thermal vias 17 and 27 may be members that extend in directions perpendicular to the third surface 11 of the first core material 15 and the fifth surface 21 of the second core material 25, respectively. For example, the thermal vias 17 and 27 may penetrate (i.e., extend through) the first core material 15 and the second core material 25, respectively. As described above, the first interposer 10 may include the thermal vias 17 penetrating (i.e., extending) from the third surface 11 of the first core material 15 to the fourth surface 12 thereof. The second interposer 20 may include the thermal vias 27 penetrating (i.e., extending) from the fifth surface 21 of the second core material 25 to the sixth surface 22 thereof. Each of the thermal vias 17 and 27 may have a pillar shape, such as a circular pillar shape or a rectangular (or square) pillar shape, having a central axis extending in the Z-axis direction. The thermal vias 17 and 27 can transfer heat between the third and fourth surfaces 11 and 12, and between the fifth and sixth surfaces 21 and 22, respectively.

The thermal vias 17 and 27 preferably contain a material having high thermal conductivity. The thermal vias 17 and 27 may contain the above-described superconducting material. The thermal vias 17 and 27 may contain the same superconducting material as that contained in the wiring layer QC4 and the like, or may contain a superconducting material different from that contained in the wiring layer QC4 and the like. Further, the thermal vias 17 and 27 may contain the above-described normal conductive material. The thermal vias 17 and 27 may contain the same normal conductive material as that contained in the interposer wiring layer 14 and the like, or may contain a normal conductive material different from that contained in the interposer wiring layer 14 and the like. Further, the thermal vias 17 and 27 may contain a ceramic having high thermal conductivity, such as aluminum nitride.

The thermal vias 27 may be connected to the cooling member 34. By adopting such a configuration, the cooling performance of the quantum device 2f can be improved. Note that the quantum device 2f may include only the cooling member 34 without including the thermal vias 17 and 27, or may include only the thermal vias 17 and 27 without including the cooling member 34. Further, the quantum device 2f may include both the cooling member 34 and the thermal vias 17 and 27.

Further, as shown in a balloon in the figure, each of the thermal vias 17 and 27 may include a tapered part (or a tapered via) in which the diameter on the Z-axis direction positive side is larger than that in the other side. That is, each of the thermal vias 17 and 27 may include a part (or a thermal via) having a roughly truncated cone shape of which the diameter on the cross section increases toward the Z-axis direction positive side. It is possible to increase the heat capacity by adopting the tapered shape and thereby to ease the abrupt temperature change. Therefore, it is possible to improve the stability of each of the thermal vias 17 and 27 against the temperature change. Further, in the case where the thermal vias are in contact with the cooling member 34, their thermal junction area with the cooling member 34 increases. Therefore, it is possible to promote (or advance) the heat transfer more effectively. It should be noted that when the temperature at the interface between each of the thermal vias 17 and 27 and its through hole (i.e., the interface between the material with which the thermal via is filled and the inner wall surface of the thermal via) is changed from a room temperature to an extremely low temperature, in some cases, the adhesive force at the interface deteriorates. For example, if a force larger than the adhesive force is applied at the interface between each of the thermal vias 17 and 27 and its through hole due to the thermal contraction, or if a material having a low elastic modulus is used for the wall surface of the thermal via, the elastic modulus increases (molecules become motionless) at an extremely low temperature, raising a possibility that exfoliation occurs due to the loss of the adhesive force. It is considered that when the exfoliation occurs, the position of each of the thermal vias 17 and 27 (i.e., the material with which the thermal via is filled) may be moved (i.e., shifted). However, since each of the thermal vias 17 and 27 has the tapered shape, the contact surface at the interface between each of the thermal vias 17 and 27 (i.e., the material with which the thermal via is filled) and its through hole can be maintained even when its vertical position may be moved (i.e., shifted). A part having a protruding shape by which the contact between each of the thermal vias 17 and 27 and the cooling member 34 is maintained even when the thermal vias 17 and 27 is moved may be formed in the cooling member 34 in advance, so that the contact between the cooling member 34 and each of the thermal vias 17 and 27 is maintained.

Further, as shown in the other balloon in the drawing, the first and second interposers 10 and 20 may include common connection members 18 and 28 that connect a plurality of thermal vias 17 and 27 to one another. For example, the plurality of thermal vias 17 and 27 may be connected to one another by a plate-like connection members 18 and 28 disposed parallel to the XY-plane. Each of the connection members 18 and 28 preferably contains a material having high thermal conductivity, and may contain a material similar to that contained in each of the thermal vias 17 and 27. Each of the plurality of thermal vias 17 and 27 connected by the connection members 18 and 28 can increase the heat capacity and thereby reduce the temperature change.

Further, a constant potential may be applied to each of the plurality of thermal vias 17 and 27 connected by the connection members 18 and 28. For example, a ground potential may be applied. In this way, the quantum chip QCH, and the first and second interposers 10 and 20 can obtain the ground potential from each of the thermal vias 17 and 27. Note that, in this case, each of the thermal vias 17 and 27, and each of the connection members 18 and 28 preferably contains an electrically conductive material having high thermal conductivity.

In the first interposer 10, an area in which a wiring line or a signal line connected to the qubit circuit QC6 is disposed generates a larger amount of heat than the other areas do. Therefore, the density of thermal vias 17 in such an area is preferably made higher than the density thereof in the other areas. For example, when the quantum chip QCH is mounted at the center of the first interposer 10 when the first core material 15 viewed from above, the density of thermal vias 17 in the central area is made higher than the density thereof in the peripheral area. Further, in the first interposer 10, the density of thermal vias 17 near the first through vias 16, which are used to transmit signals from the qubit circuit QC6, is preferably made higher than the density thereof in the other areas. In this way, the cooling performance can be improved.

Seventh Modified Example

Figure 14:
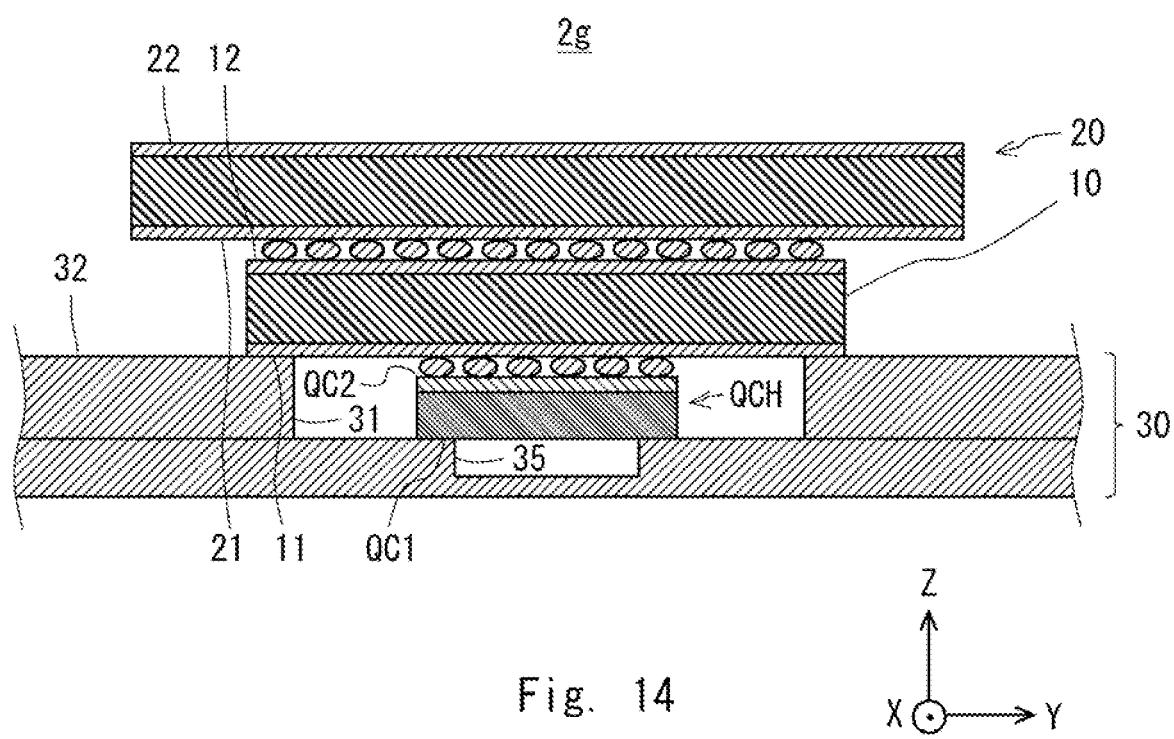
FIG. 14 is a cross-sectional diagram showing an example of a quantum device according to a seventh modified example of the second example embodiment.
Figure 15:
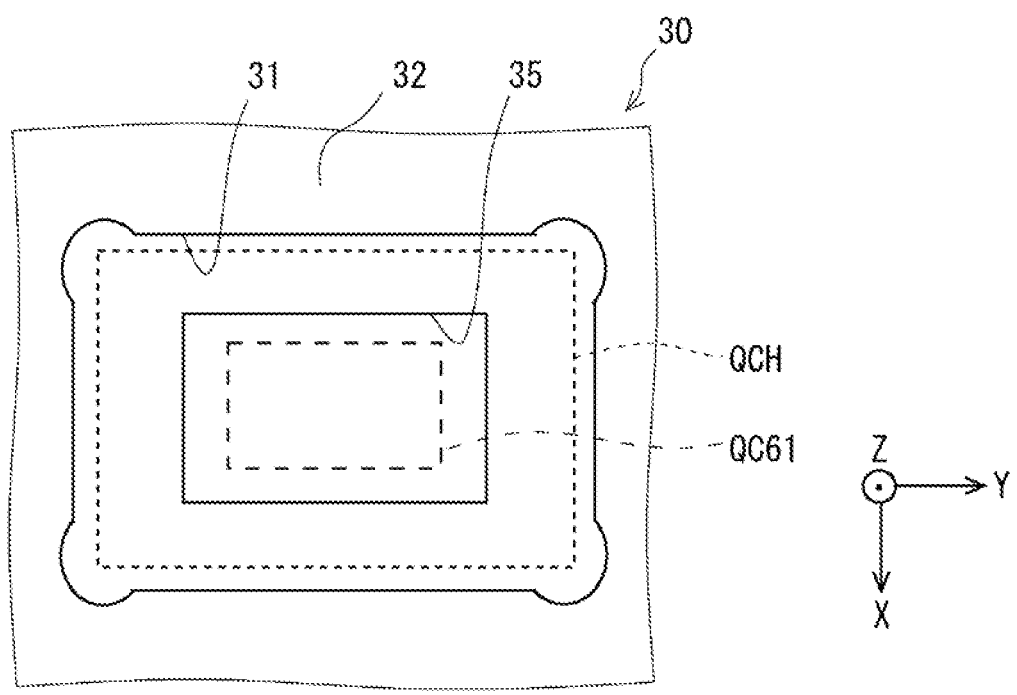
FIG. 15 is a plan view showing an example of a recess formed in the bottom of a recessed part of a sample table according to the seventh modified example of the second example embodiment.

Next, a seventh modified example of the second example embodiment will be described. This modified example includes a recess at the bottom of the recessed part 31 of the sample table 30. FIG. 14 is a cross-sectional diagram showing an example of a quantum device according to the seventh modified example of the second example embodiment. FIG. 15 is a plan view showing an example of a recess formed at the bottom of the recessed part 31 of the sample table 30 according to the seventh modified example of the second example embodiment. As shown in FIGS. 14 and 15, in the quantum device 2g according to the seventh modified example, a recess 35 is formed at the bottom of the recessed part 31. As shown in FIG. 15, as viewed from above, the area of the recess 35 is larger than an area QC61 where the qubit circuit QC6 is formed. Therefore, the area QC61 where the qubit circuit QC6 is formed is included in the area of the recess 35. The peripheral part of the first surface QC1 of the quantum chip QCH may be in contact with the bottom of the recessed part 31. The central part of the first surface QC1 of the quantum chip QCH covers the recess 35.

As viewed from above, the area of the recess 35 may be larger than the quantum chip QCH. In this case, the first surface QC1 of the quantum chip QCH is not in contact with the bottom of the recessed part 31.

In the quantum device 2g, as viewed from above, the area of the recess 35 is larger than the area QC61 where the qubit circuit QC6 is formed. Therefore, it is possible to increase the distance between the area QC61 where the qubit circuit QC6 is formed and the sample table 30 containing a metal or the like. In this way, it is possible to suppress the generation of a pseudo-capacitor (e.g., a parasitic capacitance), and thereby to reduce the effect of resonance which would otherwise occur in the main material, such as silicon, of the chip core material QC5. Therefore, it is possible to reduce the influence on the operating frequency of the qubit circuit QC6.

Eighth Modified Example

Figure 16:
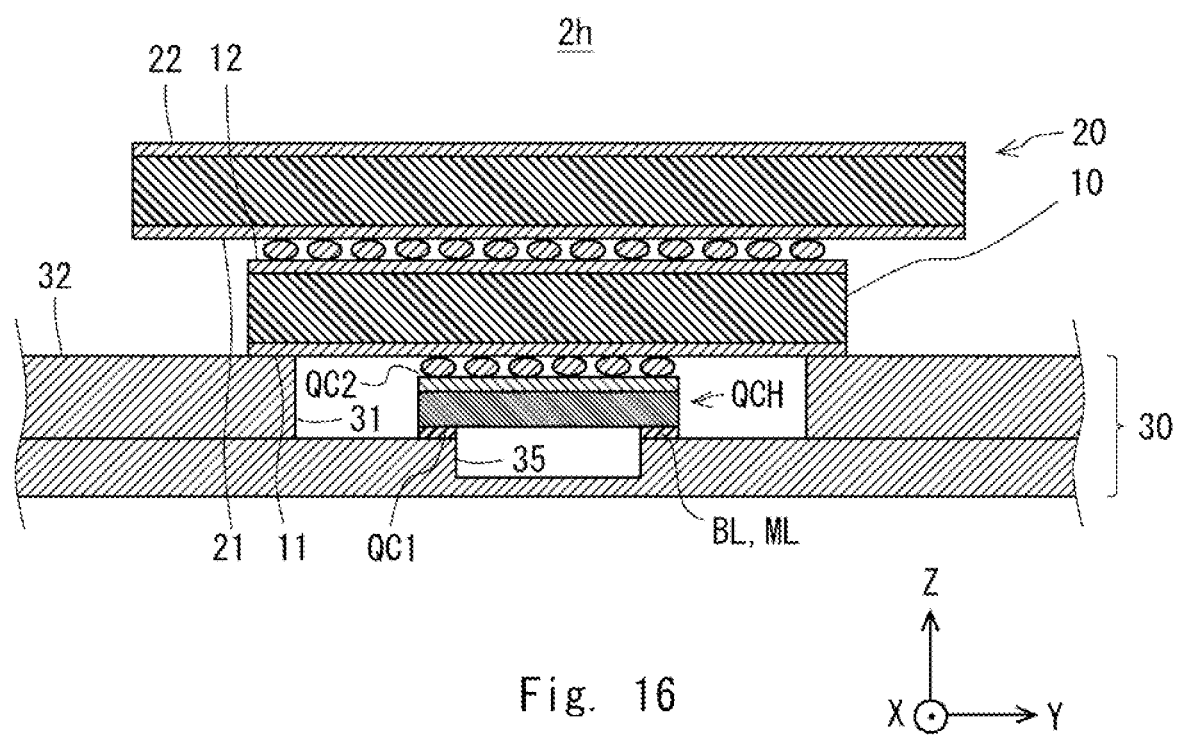
FIG. 16 is a cross-sectional diagram showing an example of a quantum device according to an eighth modified example of the second example embodiment.

Next, an eighth modified example of the second example embodiment will be described. In this modified example, the peripheral part of the first surface QC1 of the quantum chip QCH is bonded or joined to the periphery of the recess 35. FIG. 16 is a cross-sectional diagram showing an example of a quantum device according to the eighth modified example of the second example embodiment. As shown in FIG. 16, in the quantum device 2h according to the eighth modified example, the peripheral part of the first surface QC1 of the quantum chip QCH may be bonded to the bottom of the recessed part 31 by a bonding layer BL, or by a joint layer ML such as a metal layer. By the above-described configuration, it is possible to, while reducing the effect of resonance, improve the stability of the mounting of the quantum chip QCH and thereby to improve the accuracy of the position thereof. Further, the thermal connection with the sample table 30 can be improved.

Ninth Modified Example

Figure 17:
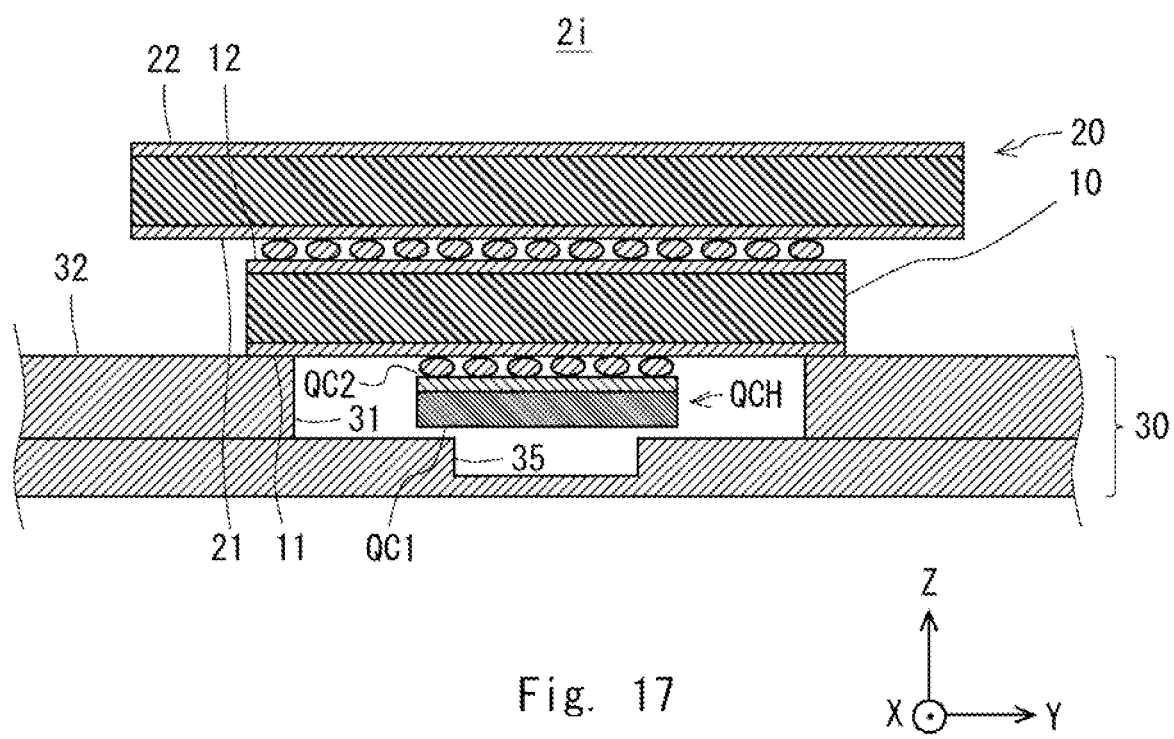
FIG. 17 is a cross-sectional diagram showing an example of a quantum device according to a ninth modified example of the second example embodiment.

Next, a ninth modified example of the second example embodiment will be described. In this modified example, there is a space between the peripheral part of the first surface QC1 of the quantum chip QCH and the periphery of the recess 35. FIG. 17 is a cross-sectional diagram showing an example of a quantum device according to the ninth modified example of the second example embodiment. As shown in FIG. 17, in the quantum device 2i according to the ninth modified example, the peripheral part of the first surface QC1 of the quantum chip QCH may not be in contact with the sample table 30. That is, the peripheral part of the first surface QC1 of the quantum chip QCH may be disposed with a space interposed between the peripheral part of the first surface QC1 and the bottom of the recessed part 31. By the above-described configuration, it is possible to, while reducing the effect of resonance, suppress the stress and the strain which would otherwise be caused by the difference between the contraction of the quantum chip QCH and that of the sample table 30 caused by the change of the temperature to an extremely low temperature.

Tenth Modified Example

Figure 18:
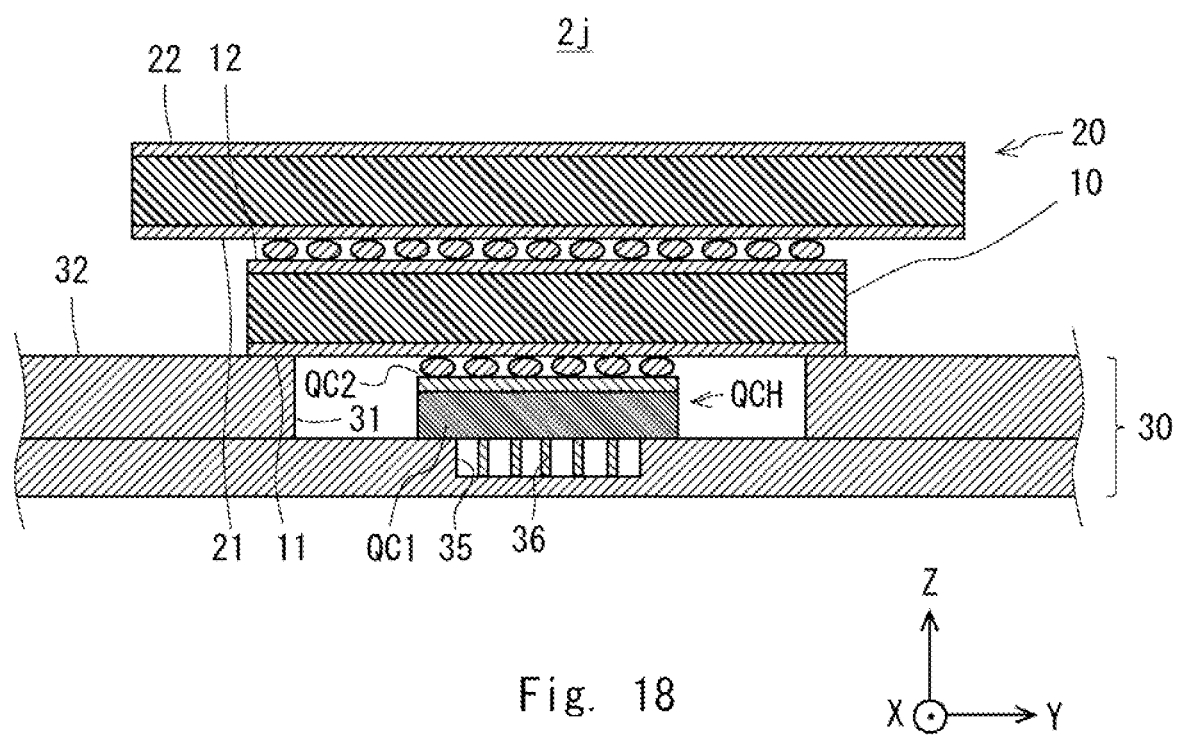
FIG. 18 is a cross-sectional diagram showing an example of a quantum device according to a tenth modified example of the second example embodiment.

Next, a tenth modified example of the second example embodiment will be described. This modified example includes pillars in the recess 35. FIG. 18 is a cross-sectional diagram showing an example of a quantum device according to the tenth modified example of the second example embodiment. As shown in FIG. 18, in the quantum device 2j according to the tenth modified example, a recess 35 is formed at the bottom of the recessed part 31. Further, in the recess 35, one or a plurality of pillars 36 are provided. The pillars 36 extend in a direction perpendicular to the first and second surfaces QC1 and QC2. One end of each of the pillars 36 is connected to the bottom of the recess 35, and the other end of each of the pillars 36 is in contact with the first surface QC1 of the quantum chip QCH. As described above, the quantum chip QCH is in contact with the pillars 36, which extend from the bottom of the recess 35 in the direction perpendicular to the first surface QC1. Each of the pillars 36 may have a circular pillar shape or a rectangular (or square) pillar shape. The one or plurality of pillars 36 may be bonded to the first surface QC1 by a bonding layer BL, or may be joined to the first surface QC1 by a metal layer.

In the quantum device 2j, as viewed from above, the area of the recess 35 is larger than the area QC61 where the qubit circuit QC6 is formed. Therefore, it is possible to increase the distance between the area QC61 where the qubit circuit QC6 is formed and the sample table 30 containing a metal or the like. In this way, it is possible to reduce the effect of resonance which would otherwise occur in the main material, such as silicon, of the chip core material QC5. In addition, since the pillars 36 are in contact with the first surface QC1 of the quantum chip QCH, the cooling performance can be improved.

Eleventh Modified Example

Figure 19:
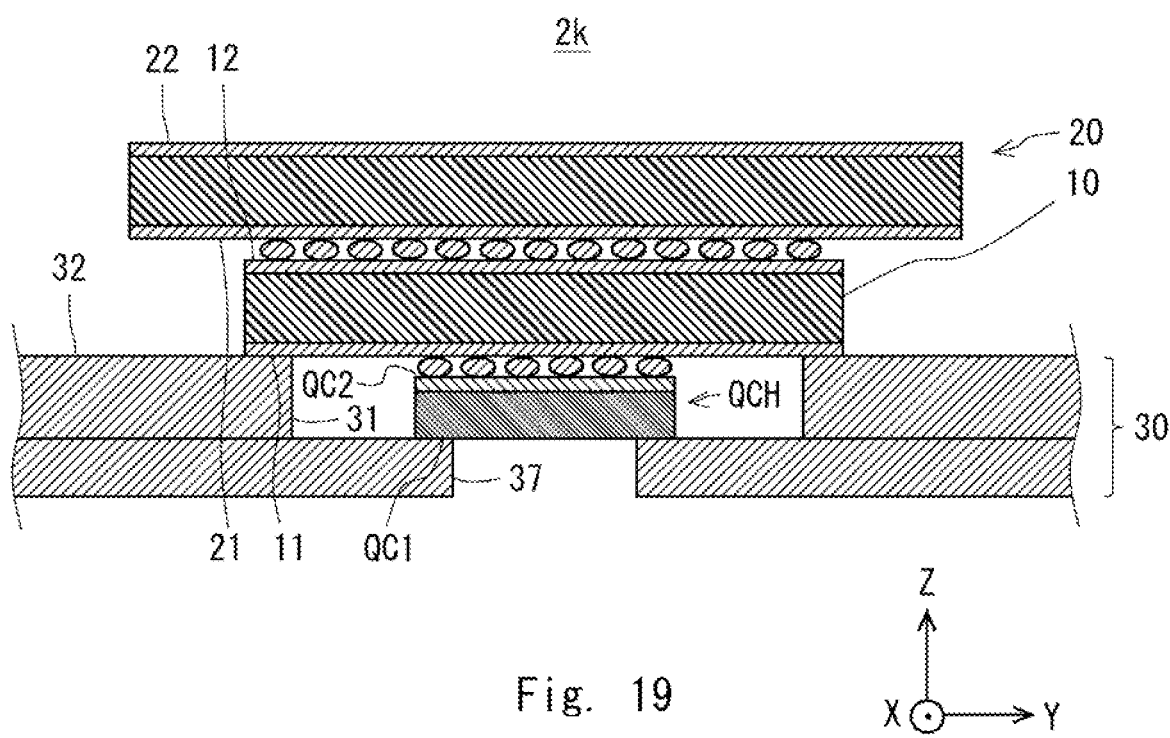
FIG. 19 is a cross-sectional diagram showing an example of a quantum device according to an eleventh modified example of the second example embodiment.

Next, an eleventh modified example of the second example embodiment will be described. This modified example includes a through hole at the bottom of the recessed part 31 of the sample table 30. FIG. 19 is a cross-sectional diagram showing an example of a quantum device according to the eleventh modified example of the second example embodiment. As shown in FIG. 19, in the quantum device 2k according to the eleventh modified example, a through hole 37 is formed at the bottom of the recessed part 31. As viewed from above, the area of the through hole 37 is larger than the area QC61 where the qubit circuit QC6 is formed. Therefore, the area QC61 where the qubit circuit QC6 is formed is included in the area of the through hole 37. The peripheral part of the first surface QC1 of the quantum chip QCH may be in contact with the bottom of the recessed part 31, or may be bonded or joined to the bottom of the recessed part 31. The central part of the first surface QC1 of the quantum chip QCH covers the through hole 37.

In the quantum device 2k, as viewed from above, the area of the through hole 37 is larger than the area QC61 where the qubit circuit QC6 is formed. Therefore, it is possible to increase the distance between the area QC61 where the qubit circuit QC6 is formed and the sample table 30 containing a metal or the like. In this way, it is possible to reduce the effect of resonance which would otherwise occur in the main material, such as silicon, of the chip core material QC5. Therefore, it is possible to reduce the influence on the operating frequency of the qubit circuit QC6.

Twelfth Modified Example

Figure 20:
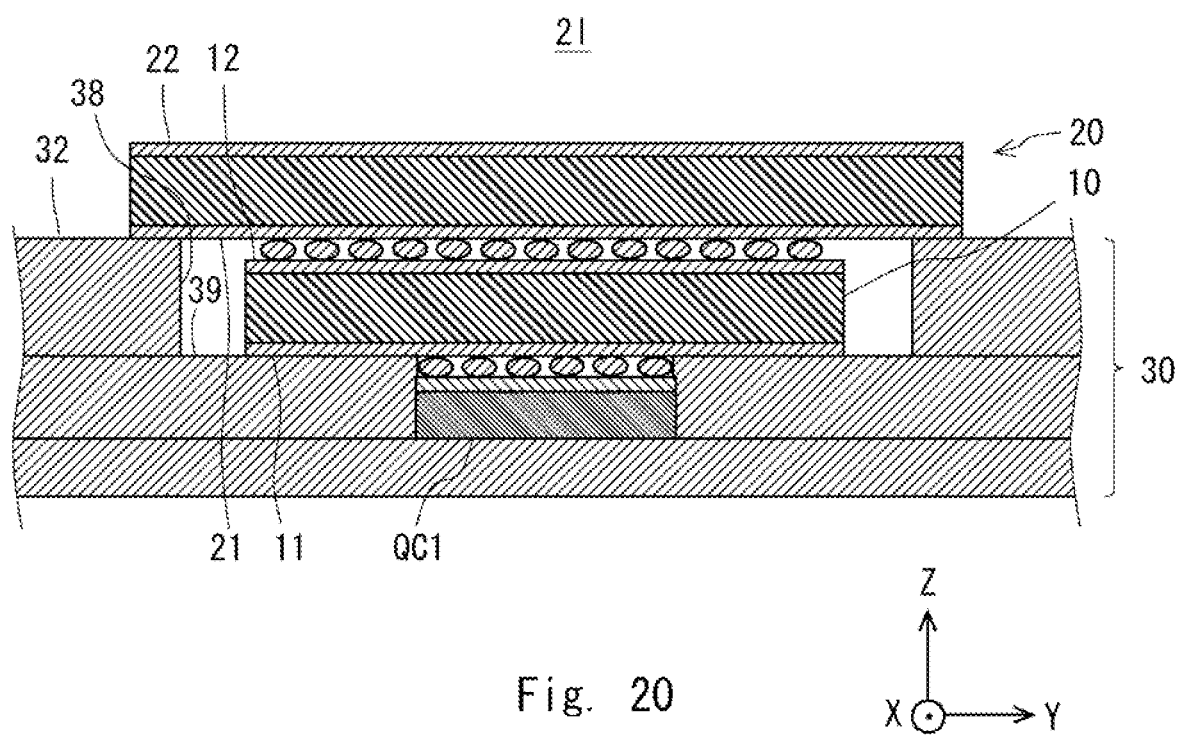
FIG. 20 is a cross-sectional diagram showing an example of a quantum device according to a twelfth modified example of the second example embodiment.

Next, a twelfth modified example of the second example embodiment will be described. In this modified example, the quantum chip QCH is fitted (i.e., inserted) into the recessed part 31 when it is cooled to an extremely low temperature. FIG. 20 is a cross-sectional diagram showing an example of a quantum device according to the twelfth modified example of the second example embodiment. As shown in FIG. 20, in the quantum device 2l according to the twelfth modified example, the quantum chip QCH is fitted into the recessed part 31 when it is cooled to an extremely low temperature. Therefore, the side surface of the quantum chip QCH is in contact with the inner surface of the recessed part 31. As a result, since the quantum chip QCH is cooled by thermal conduction through its side surface, the cooling performance can be improved.

Further, the first interposer 10 may be fitted into the countersunk hole 38 when it is cooled to an extremely low temperature. Therefore, the side surface of the first interposer 10 may be in contact with the inner surface of the countersunk hole 38. As a result, since the first interposer 10 is cooled by thermal conduction through its side surface, the cooling performance can be improved.

Note that when the quantum device 2l is cooled from a room temperature to an extremely low temperature in the order of several [mK], the volumes of the quantum chip QCH, the first interposer 10, and the sample table 30 change. Therefore, the quantum device is configured (i.e., designed) while taking the volume changes into consideration in advance so that the side surface of the quantum chip QCH comes into contact with the recessed part 31 and the side surface of the first interposer 10 comes into contact with the countersunk hole 38 when they are cooled to an extremely low temperature. Further, the ground potential of the quantum chip QCH may be obtained from the sample table 30 through the side surface of the quantum chip QCH.

Thirteenth Modified Example

Figure 21:
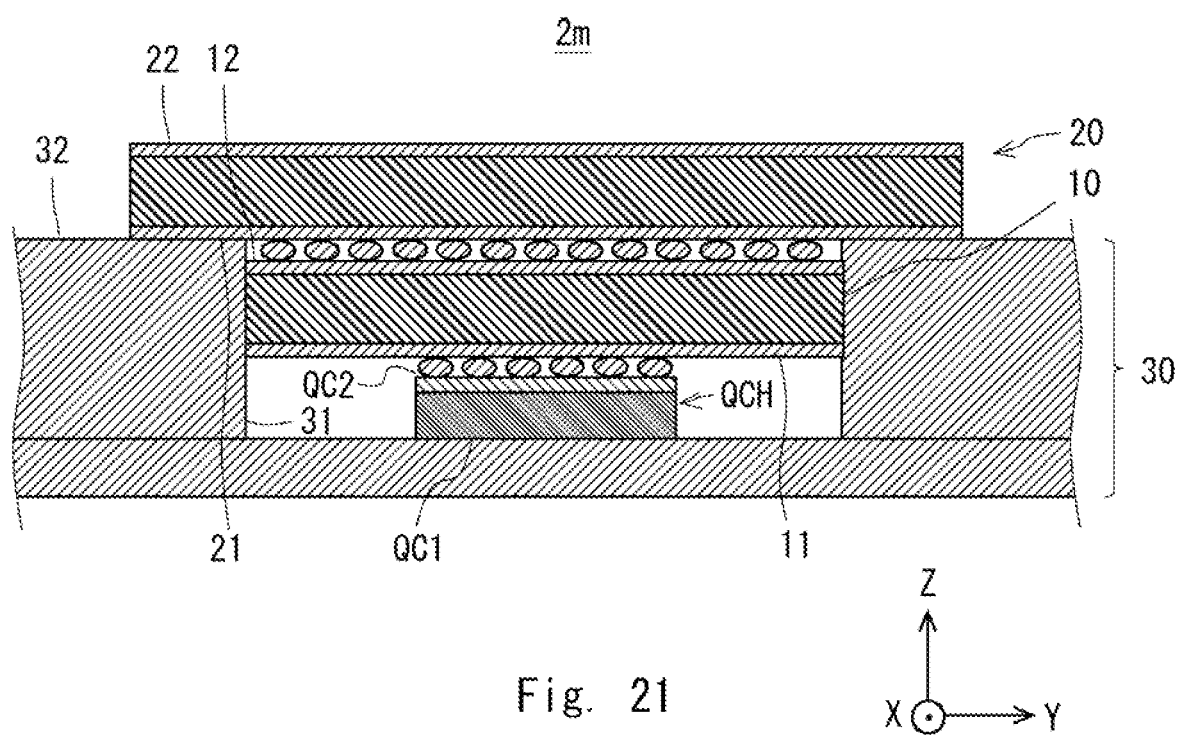
FIG. 21 is a cross-sectional diagram showing an example of a quantum device according to a thirteenth modified example of the second example embodiment.

Next, a thirteenth modified example of the second example embodiment will be described. In this modified example, the side surface of the first interposer 10 is in contact with the inner surface of the recessed part 31. FIG. 21 is a cross-sectional diagram showing an example of a quantum device according to the thirteenth modified example of the second example embodiment. As shown in FIG. 21, in the quantum device 2m according to the thirteenth modified example, at least a part of the side surface of the first interposer 10 is in contact with the inner surface of the recessed part 31.

By the above-described configuration, the third surface 11 of the first interposer 10 does not have to be in contact with the sample table 30, thus making it possible to make the best use of the third surface 11. For example, it is possible to form as large an interposer wiring layer 13 as possible on the third surface 11.

Fourteenth Modified Example

Figure 22:
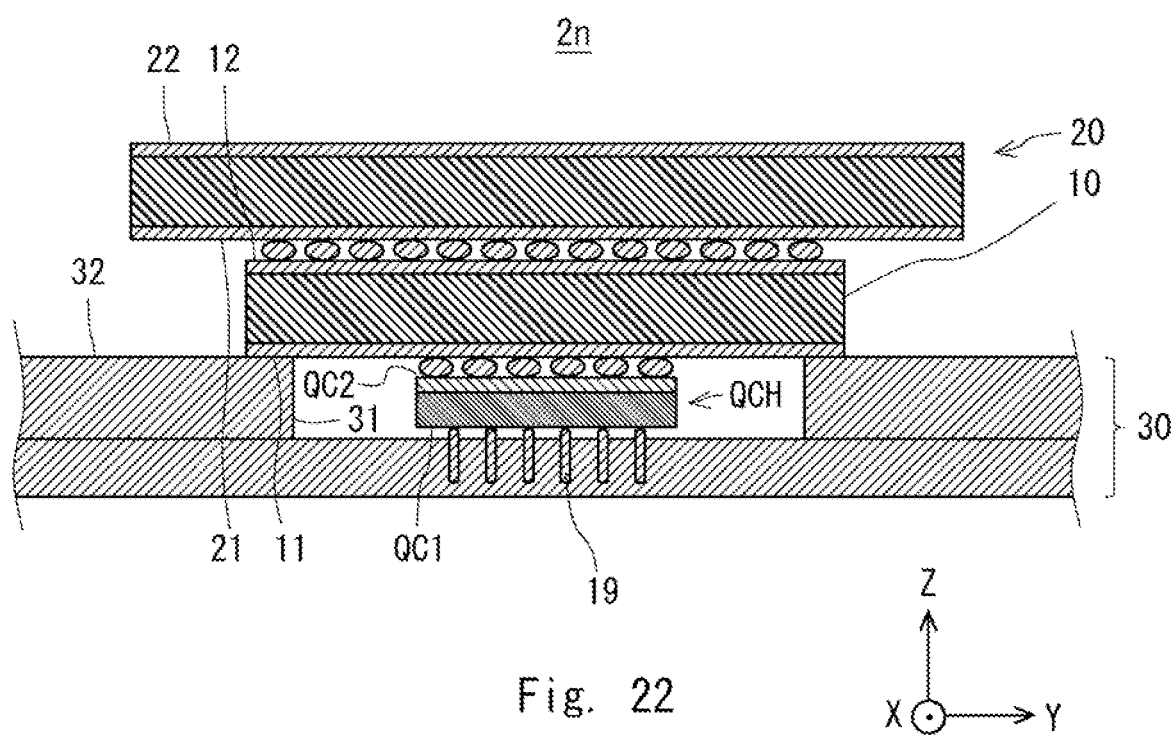
FIG. 22 is a cross-sectional diagram showing an example of a quantum device according to a fourteenth modified example of the second example embodiment.

Next, a fourteenth modified example of the second example embodiment will be described. This modified example includes movable chip pins protruding from the bottom of the recessed part 31 of the sample table 30. FIG. 22 is a cross-sectional diagram showing an example of a quantum device according to the fourteenth modified example of the second example embodiment. As shown in FIG. 22, in the quantum device 2n according to the fourteenth modified example, the first surface QC1 of the quantum chip QCH is in contact with movable chip pins 19 that are provided so as to protrude from the bottom of the recessed part 31 of the sample table 30.

For example, one or a plurality of chip pins 19 are provided at the bottom of the recessed part 31. The chip pins 19 extend in a direction perpendicular to the first surface QC1. The chip pins 19 are disposed inside a hole formed at the bottom of the recessed part 31. One end of each of the chip pins 19 is in contact with the first surface QC1 of the quantum chip QCH.

The chip pins 19 preferably contain a material having high thermal conductivity. The chip pins 19 may contain the same material as that contained in the sample table 30, or may contain the above-described superconducting material. The chip pins 19 may contain the same superconducting material as that contained in the wiring layer QC4 and the like, or may contain a superconducting material different from that contained in the wiring layer QC4 and the like. Further, the chip pins 19 may contain the above-described normal conductive material. The chip pins 19 may contain the same normal conductive material as that contained in the interposer wiring layer 14 and the like, or may contain a normal conductive material different from that contained in the interposer wiring layer 14 and the like. Further, the chip pins 19 may contain a ceramic having high thermal conductivity, such as aluminum nitride.

A constant potential may be applied to the chip pins 19. For example, a ground potential may be applied. In this way, the quantum chip QCH can obtain the ground potential from the chip pins 19. Note that, in this case, the chip pins 19 preferably contain an electrically conductive material having high thermal conductivity.

Each of the chip pins 19 is disposed inside the hole with an elastic body such as a spring. By the above-described configuration, since each of the chip pins 19 is in contact with the first surface QC1 of the quantum chip QCH, the cooling performance can be improved. Further, it is possible to suppress the stress and the strain which would otherwise be caused by the difference between the contraction of the quantum chip QCH and that of the sample table 30 caused by the change of the temperature to an extremely low temperature.

Fifteenth Modified Example

Figure 23:
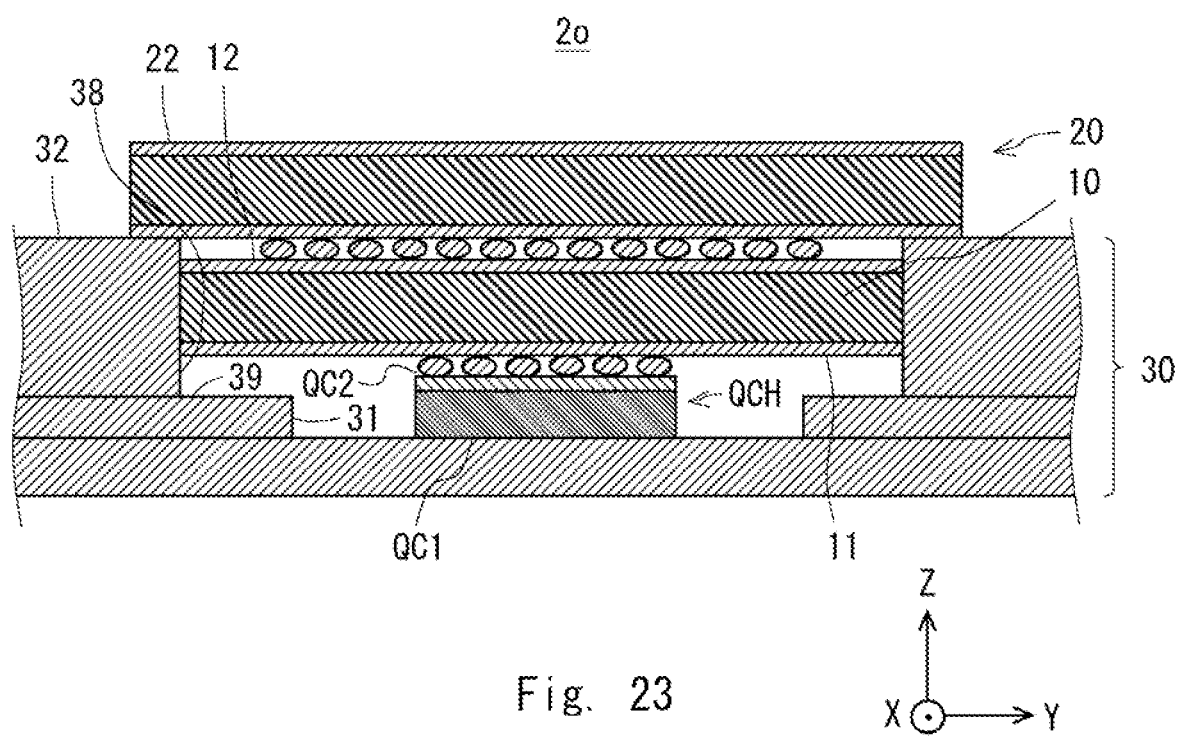
FIG. 23 is a cross-sectional diagram showing an example of a quantum device according to a fifteenth modified example of the second example embodiment.

Next, a fifteenth modified example of the second example embodiment will be described. In this modified example, the first interposer 10 is in contact with the side surface of a countersunk hole 38. FIG. 23 is a cross-sectional diagram showing an example of a quantum device according to the fifteenth modified example of the second example embodiment. As shown in FIG. 23, in the quantum device 2o, the recessed part 31 of the sample table 30 is formed in a predetermined surface 32 of the sample table 30. Further, a countersunk hole 38 is formed around the mouth of the recessed part 31. As a result, a stepped surface 39 having a step (i.e., a difference in level) with respect to the predetermined surface 32 is formed around the mouth of the recessed part 31.

In the quantum device 2o according to this modified example, at least a part of the side surface of the first interposer 10 is in contact with the side surface of the countersunk hole 38 located between the stepped surface 39 and the predetermined surface 32. Further, a part of the third surface 11 of the first interposer 10 is disposed with a space interposed between the third surface 11 and the stepped surface 39. As a result, the third surface 11 of the first interposer 10 does not have to be in contact with the sample table 30, thus making it possible to make the best use of the third surface 11.

Sixteenth Modified Example

Figure 24:
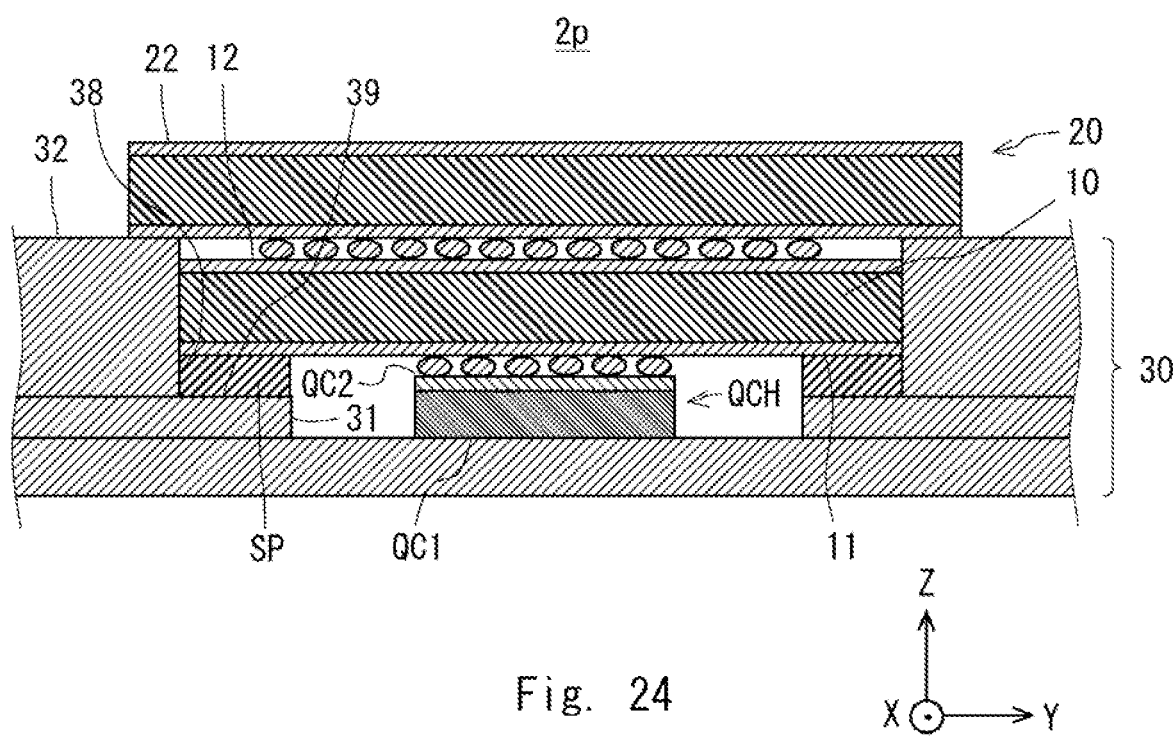
FIG. 24 is a cross-sectional diagram showing an example of a quantum device according to a sixteenth modified example of the second example embodiment.

Next, a sixteenth modified example of the second example embodiment will be described. This modified example includes a spacer(s) between the third surface 11 of the first interposer 10 and the stepped surface 39. FIG. 24 is a cross-sectional diagram showing an example of a quantum device according to the sixteenth modified example of the second example embodiment. As shown in FIG. 24, in the quantum device 2p, a part of the third surface 11 of the first interposer 10 is disposed with a spacer(s) SP interposed between the third surface 11 and the stepped surface 39. That is, the spacer(s) SP is disposed between the third surface 11 and the stepped surface 39. The spacer SP preferably contains an insulating material having high thermal conductivity, such as aluminum nitride, silicon carbide, sapphire, silicon, and alumina.

Since the quantum device 2p includes the spacer SP, it is possible to improve the stability of the mounting of the quantum chip QCH and thereby to improve the accuracy of the position thereof. Further, the thermal connection with the sample table 30 can be improved. Further, it is possible to make the best use of the third surface 11 by forming the interposer wiring layer 13 thereon.

Seventeenth Modified Example

Figure 25:
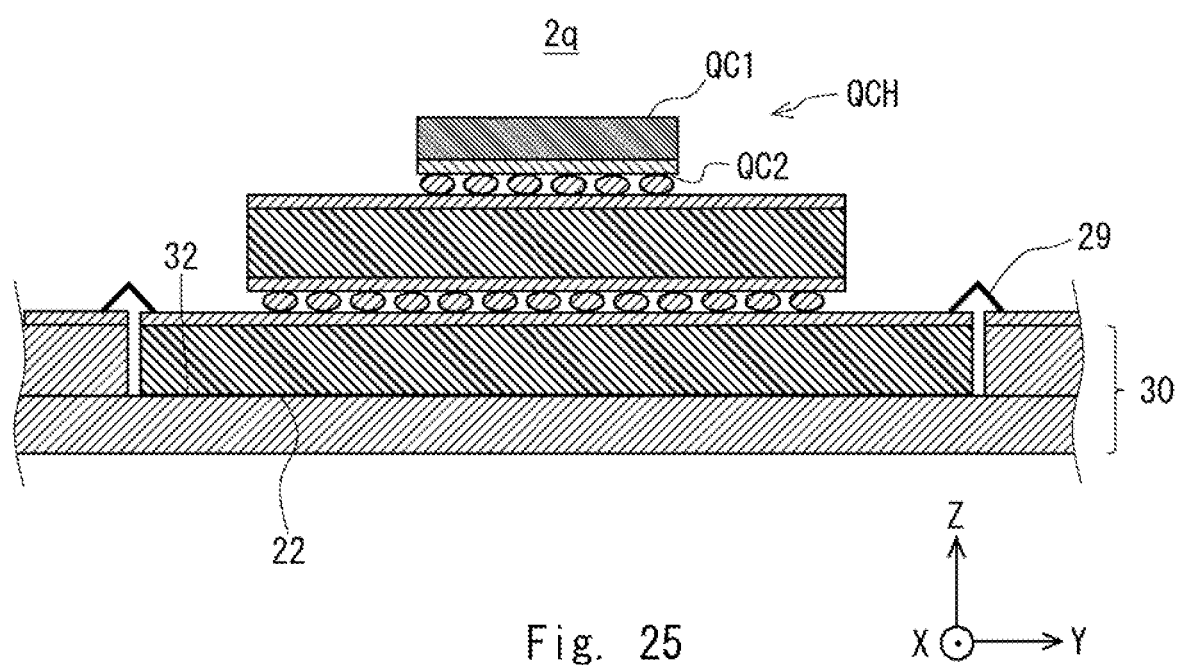
FIG. 25 is a cross-sectional diagram showing an example of a quantum device according to a seventeenth modified example of the second example embodiment.

Next, a seventeenth modified example of the second example embodiment will be described. In this modified example, the sample table 30 is in contact with the sixth surface 22 of the second interposer 20. FIG. 25 is a cross-sectional diagram showing an example of a quantum device according to the seventeenth modified example of the second example embodiment. As shown in FIG. 25, in the quantum device 2q according to the seventeenth modified example, the sixth surface 22 of the second interposer 20 is in contact with a predetermined surface 32 of the sample table 30.

In the quantum device 2q, the quantum chip QCH is cooled by the sample table 30 having a cooling function through the second interposer 20 and the first interposer 10. Further, since the sixth surface 22 of the second interposer 20 is in contact with the sample table 30, terminals 29 are formed on the fifth surface 21.

The second example embodiment and the first to seventeenth modified examples thereof have been described so far, and combinations of any two or more of these configurations of the modified examples are also included in the technical concept of the second example embodiment. For example, combinations of any of the configurations of the sample tables 30 of the second example embodiment, and the first and second modified examples thereof with any of those of the fourth to fourteenth modified examples thereof are also in the technical concept of the second example embodiment. Further, the configuration applied to the first interposer 10 may also be applied to the second interposer 20 as appropriate. Further, combinations of the first example embodiment and any of the configurations of the second example embodiment and the first to seventeenth modified examples thereof are also included in the technical concepts of the first and second example embodiments. Effects of the second example embodiment and the first to seventeenth modified examples thereof that are not described in the second example embodiment and the first to seventeenth modified examples thereof are included in the description of the first example embodiment.

Third Example Embodiment

Next, a quantum device according to a third example embodiment will be described. The quantum device according to this example embodiment includes a socket that is disposed so as to be opposed to the second interposer 20.

Figure 26:
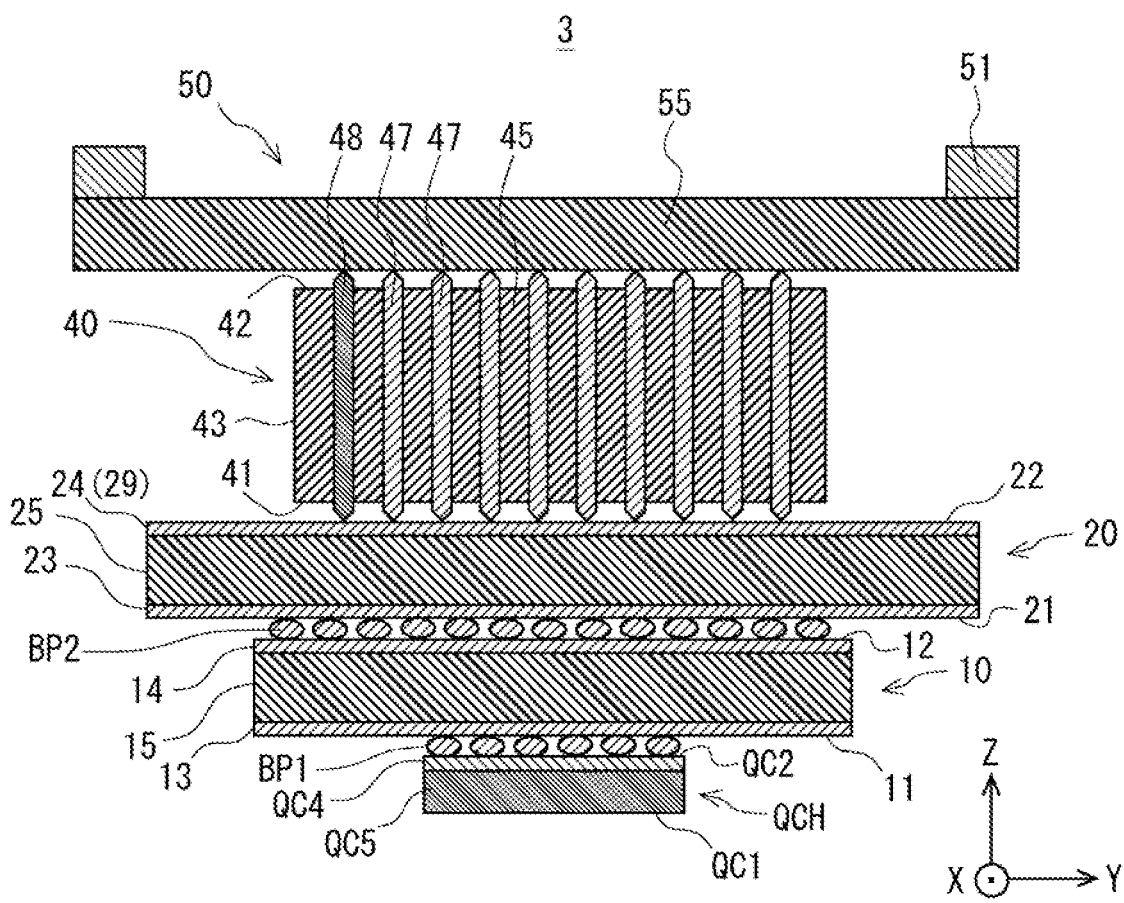
FIG. 26 is a cross-sectional diagram showing an example of a quantum device according to a third example embodiment.

FIG. 26 is a cross-sectional diagram showing an example of a quantum device according to the third example embodiment. As shown in FIG. 26, the quantum device 3 according to this example embodiment further includes a socket 40 in addition to the quantum chip QCH, the first and second interposers 10 and 20, and the first and second bumps BP1 and BP2. The configuration of the quantum chip QCH, the first and second interposers 10 and 20, and the first and second bumps BP1 and BP2 is similar to those in the first and second example embodiments. Although an XYZ-orthogonal coordinate system is also used for the explanation of the quantum device 3 in the third example embodiment, the direction of the Z-axis, which is orthogonal to the first surface QC1, is different from that in FIG. 1. That is, the direction from the quantum chip QCH toward the first interposer 10 is defined as the Z-axis positive direction.

The socket 40 is disposed so as to be opposed to the second interposer 20. For example, in this example embodiment, the socket 40 is disposed so as to be opposed to the sixth surface 22 of the second interposer 20. The socket 40 includes a housing 45 and movable pins 47. Note that, in FIG. 21, some reference numerals (or symbols) are omitted to prevent the drawing from being complicated.

The housing 45 has one end face 41 and the other end face 42 located on a side opposite to the one end face 41. Further, the housing 45 includes a side surface 43 that connects the peripheral edge of the one end face 41 to the peripheral edge of the other end face 42. The one end face 41 faces, for example, the second interposer 20, i.e., faces downward, and the other end face 42 faces upward. The housing 45 holds the movable pins 47. The housing 45 may hold a plurality of movable pins 47.

The housing 45 preferably contains an insulating material. At least a part of the housing 45 that is in contact with the movable pins 47 contains an insulating material. Further, the housing 45 preferably contains a non-magnetic material.

Further, the housing 45 contains a material having a thermal expansion coefficient roughly equal to that of the second interposer 20.

The housing 45 may contain aluminum oxide ($Al_2O_3$, also called alumina), a mica-based machinable ceramic, aluminum nitride (AlN), zirconia ($ZrO_2$), a Macor-based machinable ceramic, glass, a resin, or a silica filler-containing composite material having a low linear thermal expansion property. Alternatively, the housing 45 may contain a superconducting material, provided that the housing 45 is electrically insulated from the movable pins 47.

The movable pins 47 are held in the housing 45. Each of the movable pins 47 has one end and the other end located on a side opposite to the one end. Each of the movable pins 47 extends in the Z-axis direction, and one end thereof faces downward and the other end thereof faces upward. Therefore, the one end of each of the movable pins 47 protrudes from the one end face 41 of the housing 45. The one end of each of the movable pins 47 is, for example, electrically connected to one of the terminals 29 of the second interposer 20. The other end of each of the movable pins 47 protrudes from the other end face 42 and is electrically in contact with one of terminals of the board 50. As described above, the housing 45 includes the one end face 41 from which the one end of each of the movable pins 47 protrudes, and the other end face 42 from which the other end of each of the movable pins 47 protrudes. Although a space is formed between the one end face 41 of the housing 45 and the second interposer 20 in FIG. 26, no space may be formed as long as the one end of each of the movable pins 47 can be in contact with one of the terminals 29. Similarly, although a space is formed between the other end face 42 of the housing 45 and the board 50, no space may be formed as long as the other end of each of the movable pins 47 can be in contact with one of the terminals of the board 50.

The one end and the other end of each of the movable pins 47 are connected to each other in a conductive state with elastic means such as a coil spring or a plate spring interposed therebetween. At least one of one end and the other end of each of the movable pins 47 that is electrically in contact with one of the terminals of the second interposer 20 is movable relative to the housing 45. The other end of each of the movable pins 47 may also be movable relative to the housing 45. The other end of each of the movable pins 47 is, for example, electrically in contact with one of the terminals of the board 50 on which a connector 51 that serves as an input/output interface to the outside is formed.

The movable pins 47 may contain a superconducting material, or may contain a normal conductive material. The movable pins 47 may contain the same superconducting material as that contained in the wiring layer QC4 and the like, or may contain a superconducting material different from that contained in the wiring layer QC4 and the like. Further, the movable pins 47 may contain the same normal conductive material as that contained in the interposer wiring layer 24 and the like, or may contain a normal conductive material different from that contained in the interposer wiring layer 24 and the like. The movable pins 47 are preferably made of a normal conductive material. The movable pins 47 preferably contain, for example, a palladium alloy, a gold alloy, beryllium copper (BeCu), gold (i.e., plated with gold), niobium (Nb), niobium-titanium (Nb—Ti), or titanium (Ti).

The socket 40 may include a positioning pin 48. The positioning pin 48 is a pin for determining the position of the socket 40 (i.e., for positioning the socket 40). The positioning pin 48 is held in the housing 45. The positioning pin 48 has, for example, one end protruding from the one end face 41. The positioning pin 48 determines the position of the socket 40 (i.e., positions the socket 40) as the one end thereof is brought into contact with a predetermined position on the sixth surface 22 of the second interposer 20. Note that a hole may be formed in the sixth surface 22 of the second interposer 20, and the position of the socket 40 may be determined (the socket 40 is positioned) by inserting the positioning pin 48 into this hole. In this way, it is possible to prevent the socket 40 from being displaced.

The board 50 is disposed so as to be opposed to the other end face 42 of the socket 40. The board 50 includes a connector 51, a board substrate 55, and terminals. The board substrate 55 has, for example, a plate-like shape, and has an upper surface and a lower surface. The lower surface of the board substrate 55 is opposed to the socket 40. The terminals are provided on the lower surface of the board surface 55. The connector 51, which serves as an input/output interface to the outside, is formed on the upper surface of the board surface 55. The connector 51 of the board 50 is connected to the terminals of the board 50. The other end of each of the movable pins 47 is electrically in contact with one of the terminals of the board 50.

The board 50, on which the connector 51 which serves as an input/output interface from/to the outside is formed, receives/outputs electric power, signals, and the like from/to the quantum chip QCH through the socket 40 and the second interposer 20.

Next, advantageous effects of this example embodiment will be described. The quantum device 3 according to this example embodiment includes the socket 40, which is disposed so as to be opposed to the second interposer 20. The socket 40 includes the movable pins 47 that are movable relative to the housing 45, and hence are electrically in contact with the terminals 29 of the second interposer 20. Therefore, since the movable pins 47 can move in conformity with the volume change of the terminals and the like that occurs when the quantum device 3 is cooled to an extremely low temperature, they can prevent the terminals connected to the second interposer 20 from being disconnected therefrom. As described above, one end and the other end of each of the movable pins 47 are connected to each other in a conductive state with elastic means such as a coil spring or a plate spring interposed therebetween, and therefore each of the movable pins 47 is disposed between the second interposer 20 and the board 50 in a pressed state. Therefore, each of the movable pins 47 is in a state in which a pressure is applied against the second interposer 20 and against the board 50 by the elastic means. Because of this pressed state, each of the movable pins 47 can move in conformity with the volume change due to the contraction or the like caused by cooling, so that it is possible to maintain the contact with the terminals and the like and thereby to effectively prevent them from being disconnected.

Further, in the socket 40, the other end of each of the movable pins 47 is electrically in contact with one of the terminals of the board 50, on which the connector 51 which serves as an input/output interface to the outside is formed. Therefore, it is possible to secure the terminals connected to the outside.

By providing the positioning pin 48, the position of the socket 40 can be easily determined (i.e., the socket 40 can be easily positioned). Further, by inserting the positioning pin 48 into the hole formed in the sixth surface 22, the socket 40 can be prevented from being displaced.

First Modified Example

Next, a quantum device according to a first modified example of the third example embodiment will be described.

Figure 27:
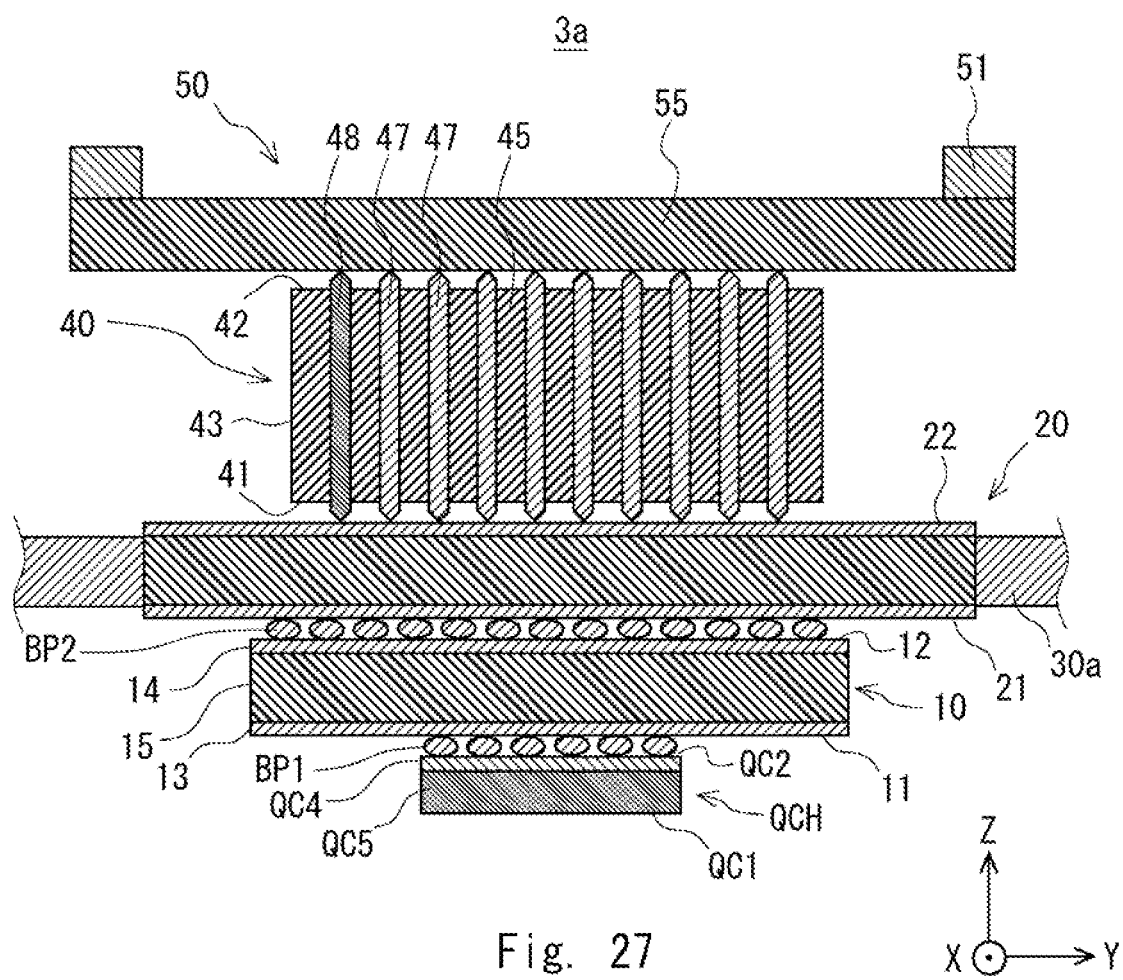
FIG. 27 is a cross-sectional diagram showing an example of a quantum device according to a first modified example of the third example embodiment.

In the quantum device according to the first modified example, at least one of the quantum chip QCH, the first interposer 10, the second interposer 20, and the socket 40 is in contact with the sample table 30 having a cooling function. FIG. 27 is a cross-sectional diagram showing an example of a quantum device according to the first modified example of the third example embodiment. As shown in FIG. 27, in the quantum device 3a, for example, among the quantum chip QCH, the first interposer 10, the second interposer 20, and the socket 40, the side surface of the second interposer 20 is in contact with the sample table 30 having the cooling function. The sample table 30 includes, for example, a plate-like part 30a. The plate-like part 30a sandwiches the side surface of the second interposer 20 therebetween.

In the quantum device 3a, the second interposer 20 is used as a heat flowing path. Therefore, it is possible to cool the quantum device 3a by thermal conduction through the side surface of the second interposer 20. Further, it is possible to make the best use of the fifth and sixth surfaces 21 and 22 of the second interposer 20 in order to provide terminals.

Second Modified Example

Figure 28:
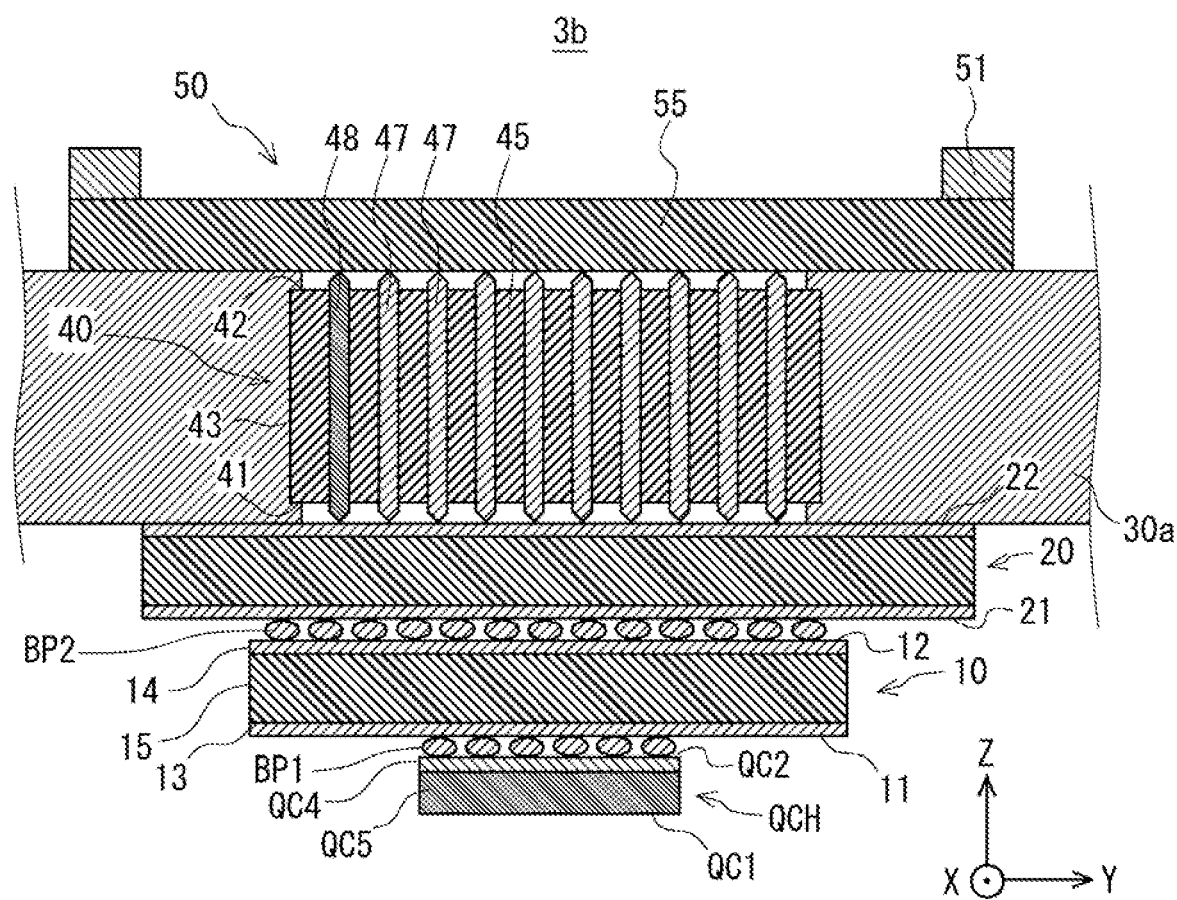
FIG. 28 is a cross-sectional diagram showing an example of a quantum device according to a second modified example of the third example embodiment.

Next, a second modified example of the third example embodiment will be described. In this modified example, only a part of the socket 40 is in contact with the sample table 30. FIG. 28 is a cross-sectional diagram showing an example of a quantum device according to the second modified example of the third example embodiment. As shown in FIG. 28, in the quantum device 3b, the side surface 43 of the housing 45 is in contact with the sample table 30 having a cooling function. The sample table 30 includes, for example, a plate-like part 30a. The plate-like part 30a sandwiches the side surface 43 of the housing 45 therebetween. Note that, in the quantum device 3b, instead of or in addition to the side surface 43 of the housing 45, a part of the one end face 41 of the housing 45 may be in contact with the sample table 30, and/or a part of the other end face 42 of the housing 45 may be in contact with the sample table 30.

In the quantum device 3b, since a part of at least one of the one end face 41, the other end face 42, and the side surface 43 of the housing 45 is in contact with the sample table 30 having the cooling function, the quantum device 3b can be cooled by thermal conduction through the sample table 30. As a result, the cooling performance of the quantum device 3b can be improved.

Third Modified Example

Figure 29:
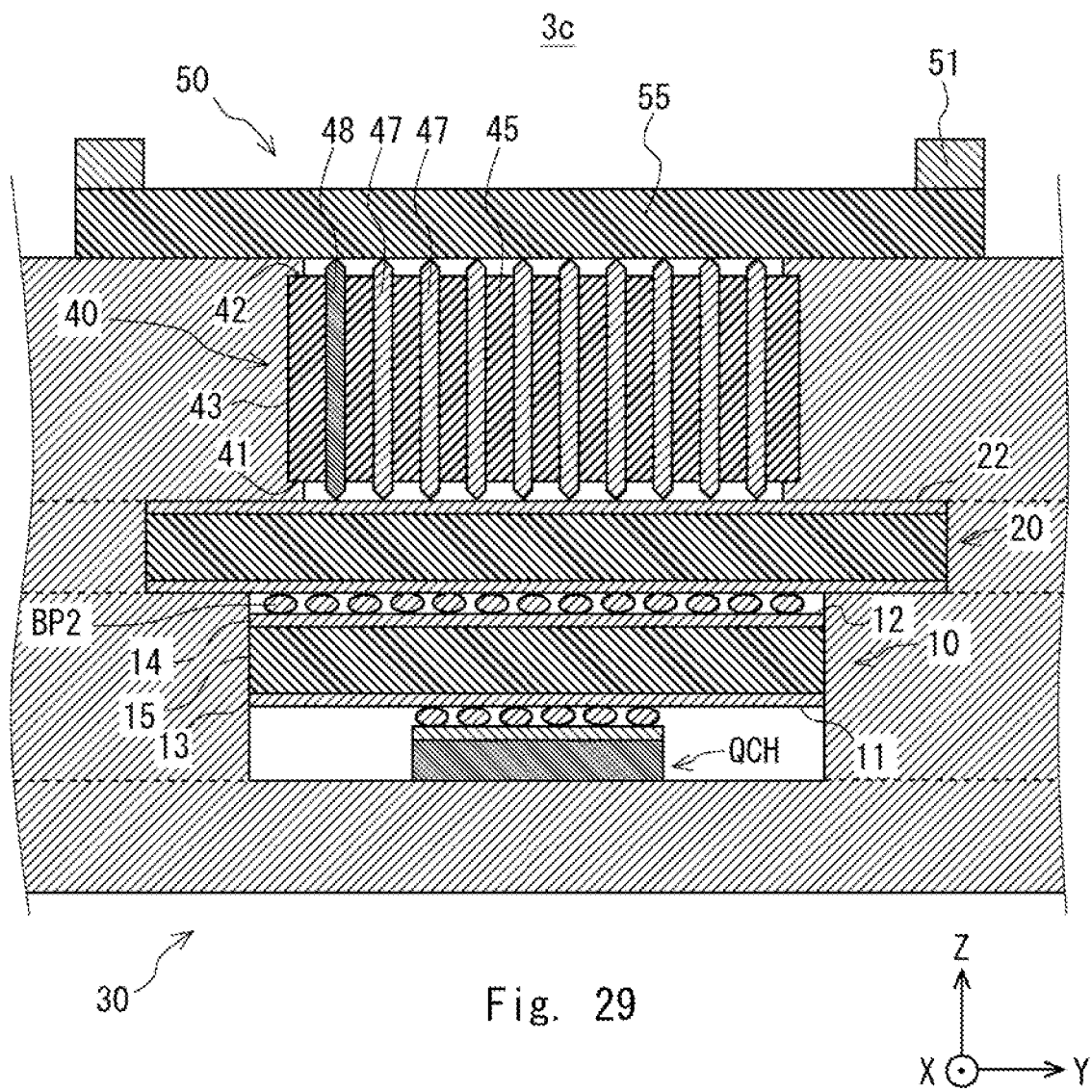
FIG. 29 is a cross-sectional diagram showing an example of a quantum device according to a third modified example of the third example embodiment.

Next, a third modified example of the third example embodiment will be described. In this modified example, each of at least a part of the quantum chip QCH, at least a part of the first interposer 10, at least a part of the second interposer 20, and at least a part of the socket 40 is in contact with the sample table 30 having a cooling function. FIG. 29 is a cross-sectional diagram showing an example of a quantum device according to the third modified example of the third example embodiment.

As shown in FIG. 29, in the quantum device 3c, at least a part of the quantum chip QCH, at least a part of the first interposer 10, at least a part of the second interposer 20, and at least a part of the socket 40 are in contact with the sample table 30. Specifically, for example, the quantum chip QCH and the first interposer 10 are disposed inside the recessed part 31 of the sample table 30 and are in contact with the inner surface thereof. The second interposer 20 and the socket 40 are sandwiched by the plate-like part 30a of the sample table 30. Further, at least one of a part of the fifth and sixth surfaces 21 and 22 of the second interposer 20 and a part of the one end face 41 and the other end face 42 of the socket 40 may be in contact with the sample table 30.

In the quantum device 3c, since a part of each of the quantum chip QCH, the first interposer 10, the second interposer 20, and the socket 40 is in contact with the sample table 30, the cooling performance of the quantum device 3c can be improved.

Fourth Modified Example

Figure 30:
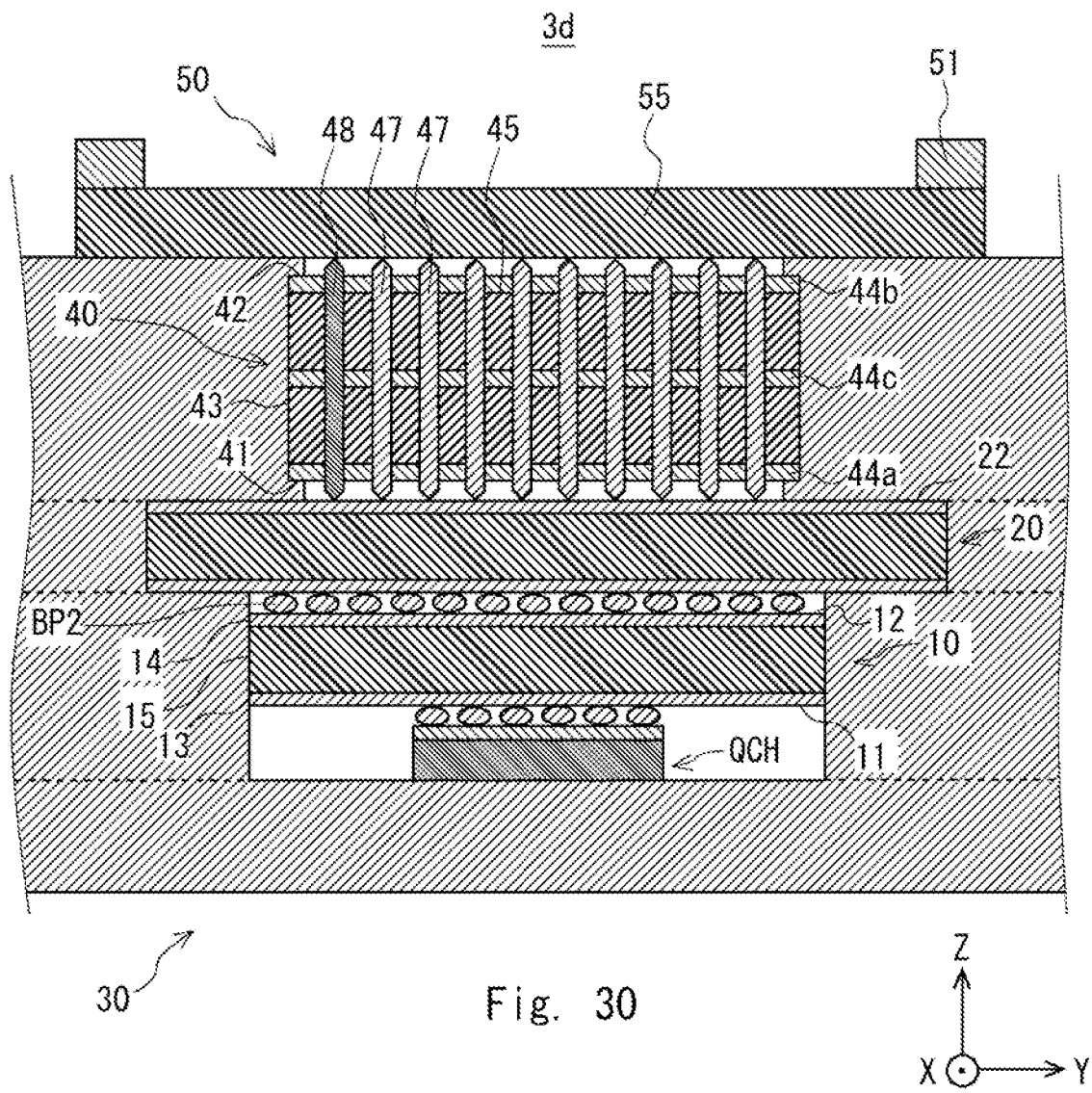
FIG. 30 is a cross-sectional diagram showing an example of a quantum device according to a fourth modified example of the third example embodiment.

Next, a fourth modified example of the third example embodiment will be described. The socket 40 according to this modified example includes a heat-dissipating layer (or a heat-radiating layer) that is in contact with the sample table 30. FIG. 30 is a cross-sectional diagram showing an example of a quantum device according to the fourth modified example of the third example embodiment. As shown in FIG. 30, in the quantum device 3d, the socket 40 includes heat-dissipating layers 44a, 44b and 44c that are in contact with the sample table 30 having a cooling function.

The heat-dissipating layer 44a and the like preferably contain a material having high thermal conductivity. The heat-dissipating layer 44a and the like may contain the above-described superconducting material. The heat-dissipating layer 44a and the like may contain the same superconducting material as that contained in the wiring layer QC4 and the like, or may contain a superconducting material different from that contained in the wiring layer QC4 and the like. Further, the heat-dissipation layer 44a and the like may contain the above-described normal conductive material. The heat-dissipation layer 44a and the like may contain the same normal conductive material as that contained in the interposer wiring layer 14 and the like, or may contain a normal conductive material different from that contained in the interposer wiring layer 14 and the like. Further, the heat-dissipating layer 44a and the like may contain a ceramic having high thermal conductivity, such as aluminum nitride. When the heat-dissipating layer 44a and the like contain a conductive material, they are preferably covered with an insulating film in order to maintain the electrical insulation from the movable pins 47.

The heat-dissipating layer 44a is disposed on the one end face 41 of the housing 45. Therefore, the heat-dissipating layer 44a is exposed in the one end face 41. The heat-dissipating layer 44b is disposed on the other end face 42 of the housing 45. Therefore, the heat-dissipating layer 44b is exposed in the other end face 42. The heat-dissipating layer 44c is disposed at the center of the housing 45 and is parallel to the XY-plane. The heat-dissipating layer 44c is exposed in the side surface 43 of the housing 45. At least one of the heat-dissipating layers 44a, 44b and 44c may be disposed in the quantum device 3d.

The heat-dissipating layers 44a, 44b and 44c may be in contact with the sample table 30. For example, the heat-dissipating layers 44a, 44b and 44c are in contact with the plate-like part of the sample table 30. As described above, the socket 40 includes a heat-dissipating layer(s) that is exposed in at least one of the one end face 41, the other end face 42, and the side face 43 of the housing 45 and is in contact with the sample table 30.

In the quantum device 3d, since the socket 40 includes the heat-dissipating layers 44a, 44b and 44c, the cooling performance of the quantum device 3d can be improved. When the heat-dissipating layers 44a, 44b and 44c are in contact with the sample table 30, the cooling performance of the quantum device 3d can be further improved.

Fifth Modified Example

Figure 31:
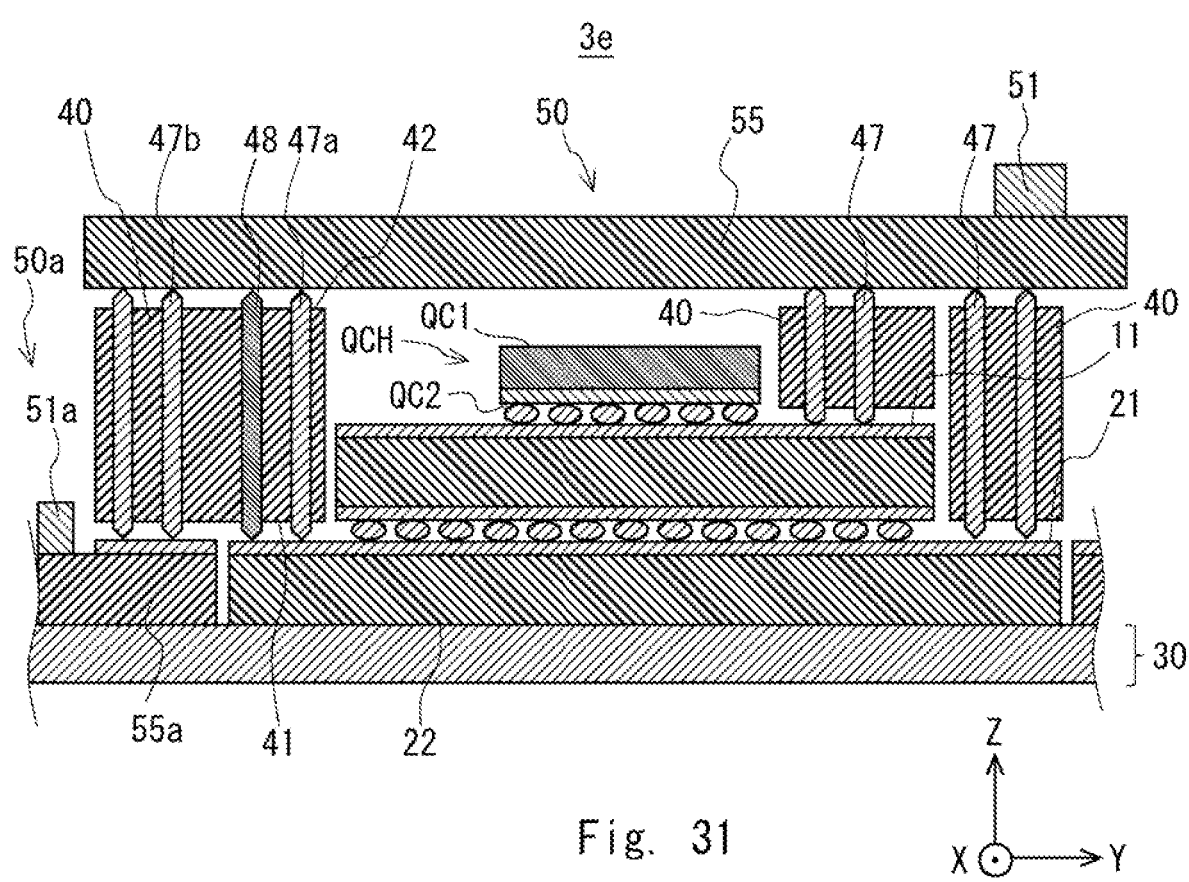
FIG. 31 is a cross-sectional diagram showing an example of a quantum device according to a fifth modified example of the third example embodiment.

Next, a fifth modified example of the third example embodiment will be described. The socket 40 according to this modified example is disposed on the third surface 11 of the first interposer 10 and on the fifth surface 21 of the second interposer 20. FIG. 31 is a cross-sectional diagram showing an example of a quantum device according to the fifth modified example of the third example embodiment.

As shown in FIG. 31, in the quantum device 3e, the socket 40 is disposed on the third surface 11 of the first interposer 10 and on the fifth surface 21 of the second interposer 20. Note that, in FIG. 31, a direction perpendicular to the first surface QC1 is defined as a Z-axis direction. Further, the first surface QC1 side is defined as a Z-axis positive direction and the second surface QC2 side is defined as a Z-axis negative direction. For the sake of explanation, the Z-axis direction positive side is defined as upward and the Z-axis direction negative side is defined as downward. Therefore, in the quantum device 3e according to this example embodiment, the socket 40 is disposed above the second interposer 20 (on the Z-axis positive direction side of the second interposer 20).

The sixth surface 22 of the second interposer 20 may be in contact with the sample table 30. In this way, the quantum chip QCH can be cooled through the second interposer 20. Note that the ground potential of at least one of the quantum chip QCH, the first interposer 10, and the second interposer 20 may be obtained from the sample table 30 through the second through vias 26 of the second interposer 20.

The socket 40 is disposed (i.e., laid out) around the quantum chip QCH, for example, in a square frame shape, or in a U-shape as viewed from above. One end of each of the movable pins 47 may be electrically in contact with one of terminals disposed on the third surface 11 of the first interposer 10. Alternatively or additionally, one end of each of the movable pins 47 may be electrically in contact with one of terminals disposed on the fifth surface 21 of the second interposer 20. One end of each of the movable pins 47 is movable relative to the housing 45. The other end of each of the movable pins 47 is electrically in contact with one of terminals of the board 50, on which a connector 51 which serves as an input/output interface to the outside is formed.

The board 50 is disposed so as to be opposed to the other end face 42 of the socket 40 as in the case of the previously-described modified examples. In this modified example, a board 50a may be disposed alongside the second interposer 20 on the sample table 30. The lower surface of a board substrate 55a in the board 50a is in contact with the sample table 30. A connector 51a and terminals are formed on the upper surface of the board substrate 55a. The socket 40 may be disposed (i.e., may extend) above both the fifth surface 21 of the second interposer 20 and the upper surface of the board 50a. Further, a plurality of terminals formed on the lower surface of the board 50 may be connected to each other. In such a case, a terminal formed on the fifth surface 21 of the second interposer 20 may be connected to the connector 51a of the board 50a through one end of one of the movable pins 47a, the other end of that movable pin 47a, a terminal of the board 50, another terminal of the board 50, one end of one of the movable pins 47b, the other end of that movable pin 47b, and a terminal of the board 50a in this order.

The boards 50 and 50a, on which the connectors 51 and 51a which serve as input/output interfaces from/to the outside are respectively formed, receive/output electric power, signals, and the like from/to the quantum chip QCH through the socket 40 and the second interposer 20.

According to the quantum device 3e in accordance with this modified example, since the number of connectors 51a, which serve as input/output interfaces from/to the outside, can be increased, the number of terminals connected to the outside can be increased. Further, since the sixth surface 22 of the second interposer 20 can be disposed so as to be in contact with the sample table 30, the cooling performance of the quantum device 3e can be improved.

Although the present disclosure has been described with reference to the example embodiments, the present disclosure is not limited to the above-described first to third example embodiments, and they can be modified as appropriate without departing from the scope and spirit of the disclosure. For example, those that are obtained by combining parts of the configurations of the first to third example embodiments and the modified examples thereof as appropriate, those in which a plurality of quantum chips QCH are connected to the first and second interposers 10 and 20, and those in which a plurality of first and second interposers 10 and 20 are connected to the socket 40 are also included in the scope of the technical concepts of the example embodiments.

The whole or part of the example embodiments disclosed above can be described as, but not limited to, the following supplementary notes.

(Supplementary Note 1)
A quantum device comprising:
a quantum chip with a first surface and a second surface located on a side opposite to the first surface, in the quantum chip, at least a part of a qubit circuit being provided on the second surface;
a first interposer with a third surface and a fourth surface located on a side opposite to the third surface, the first interposer being connected to the quantum chip in such a manner that the second surface of the quantum chip is opposed to the third surface of the first interposer; and
a second interposer with a fifth surface and a sixth surface located on a side opposite to the fifth surface, the second interposer being connected to the first interposer in such a manner that the fourth surface of the first interpose is opposed to the fifth surface of the second interposer, wherein
the quantum chip is disposed inside a recessed part formed in a sample table having a cooling function, and
a part of at least one of the first and second interposers is in contact with the sample table.

(Supplementary Note 2)
The quantum device described in Supplementary note 1, wherein at least a part of the first surface is in contact with an inner surface of the recessed part.

(Supplementary Note 3)
The quantum device described in Supplementary note 1 or 2, wherein at least a part of the first surface is bonded or joined to an inner surface of the recessed part.

(Supplementary Note 4)
The quantum device described in any one of Supplementary notes 1 to 3, wherein the first surface is disposed with a space interposed between the first surface and an inner surface of the recessed part.

(Supplementary Note 5)
The quantum device described in any one of Supplementary notes 1 to 4, wherein
the recessed part is formed in a predetermined surface of the sample table, and
a part of the third surface is in contact with the predetermined surface.

(Supplementary Note 6)
The quantum device described in Supplementary note 5, wherein at least a part of a side surface of the first interposer is in contact with a plurality of holding members provided on the predetermined surface.

(Supplementary Note 7)
The quantum device described in Supplementary note 6, wherein
the first interposer is rectangular as viewed in a direction perpendicular to the third surface, and
each of the plurality of holding members holds a side surface of the first interposer near a respective one of corners thereof with its planar part.

(Supplementary Note 8)
The quantum device described in any one of Supplementary notes 1 to 7, wherein the sixth surface is in contact with a cooling member having a cooling function.

(Supplementary Note 9)
The quantum device described in any one of Supplementary notes 1 to 8, wherein the first interposer comprises a first core material, and a thermal via penetrating the first core material from the third surface side to the fourth surface side.

(Supplementary Note 10)
The quantum device described in Supplementary note 9, wherein the thermal via includes a tapered part of which a diameter on the fourth surface side is larger than that on the third surface side.

(Supplementary Note 11)
The quantum device described in Supplementary note 9 or 10, wherein the first interposer further comprises a common connection member configured to connect a plurality of thermal vias to each other.

(Supplementary Note 12)
The quantum device described in any one of Supplementary notes 1 to 11, wherein
the quantum chip comprises a qubit circuit in which pieces of a superconducting material are connected to each other in a circular manner by Josephson junctions,
a recess is formed at a bottom of the recessed part, and
an area where the qubit circuit is formed is included in an area of the recess as viewed in a direction perpendicular to the second surface of the quantum chip, the quantum chip being mounted on the first interposer so that the second surface thereof is opposed to the first interposer.

(Supplementary Note 13)
The quantum device described in Supplementary note 12, wherein the quantum chip is in contact with a pillar extending from a bottom of the recess in the direction perpendicular to the second surface.

(Supplementary Note 14)
The quantum device described in any one of Supplementary notes 1 to 11, wherein
the quantum chip comprises a qubit circuit in which pieces of a superconducting material are connected to each other in a circular manner by Josephson junctions,
a through hole is formed at a bottom of the recessed part, and
an area where the qubit circuit is formed is included in an area of the through hole as viewed in a direction perpendicular to the second surface of the quantum chip, the quantum chip being mounted on the first interposer so that the second surface thereof is opposed to the first interposer.

(Supplementary Note 15)

The quantum device described in any one of Supplementary notes 1 to 14, wherein a side surface of the quantum chip is in contact with an inner surface of the recessed part.

(Supplementary Note 16)

The quantum device described in any one of Supplementary notes 1 to 15, wherein
the recessed part is formed in a predetermined surface of the sample table, and
at least a part of a side surface of the first interposer is in contact with an inner surface of the recessed part.

(Supplementary Note 17)

The quantum device described in any one of Supplementary notes 1 to 15, wherein
the recessed part is formed in a predetermined surface of the sample table,
a stepped surface including a step with respect to the predetermined surface is formed around a mouth of the recessed part, and
a part of the third surface of the first interposer is in contact with the stepped surface.

(Supplementary Note 18)

The quantum device described in any one of Supplementary notes 1 to 15, wherein
the recessed part is formed in a predetermined surface of the sample table,
a stepped surface including a step with respect to the predetermined surface is formed around a mouth of the recessed part, and
at least a part of a side surface of the first interposer is in contact with a side surface between the stepped surface and the predetermined surface.

(Supplementary Note 19)

The quantum device described in Supplementary note 18, wherein a part of the third surface of the first interposer is disposed with a space interposed between the third surface and the stepped surface.

(Supplementary Note 20)

The quantum device described in Supplementary note 18, wherein a part of the third surface of the first interposer is disposed with a spacer interposed between the third surface and the stepped surface.

(Supplementary Note 21)

A quantum device comprising:
a quantum chip with a first surface and a second surface located on a side opposite to the first surface, in the quantum chip, at least a part of a qubit circuit being provided on the second surface;
a first interposer with a third surface and a fourth surface located on a side opposite to the third surface, the first interposer being connected to the quantum chip in such a manner that the second surface of the quantum chip is opposed to the third surface of the first interposer;
a second interposer with a fifth surface and a sixth surface located on a side opposite to the fifth surface, the second interposer being connected to the first interposer in such a manner that the fourth surface of the first interpose is opposed to the fifth surface of the second interposer; and
a socket disposed so as to be opposed to the second interposer, the socket comprising a movable pin and a housing supporting the movable pin, wherein
at least one of one end of the movable pin electrically in contact with a terminal of the second interposer and the other end thereof located on a side opposite to the one end is movable relative to the housing, and
the other end is electrically in contact with a terminal of a board comprising a connector formed therein, the connector serving as an input/output interface to the outside.

(Supplementary Note 22)

The quantum device described in Supplementary note 21, wherein a part of at least one of the quantum chip, the first interposer, the second interposer, and the socket is in contact with a sample table having a cooling function.

(Supplementary Note 23)

The quantum device described in Supplementary note 21, wherein
the quantum chip is disposed inside a recessed part formed in a sample table having a cooling function, and
a part of at least one of the first and second interposers is in contact with the sample table.

(Supplementary Note 24)

The quantum device described in Supplementary note 23, wherein at least a part of the first surface is in contact with an inner surface of the recessed part.

(Supplementary Note 25)

The quantum device described in Supplementary note 23, wherein at least a part of the first surface is bonded or joined to an inner surface of the recessed part.

(Supplementary Note 26)

The quantum device described in Supplementary note 23, wherein the first surface is disposed with a space interposed between the first surface and an inner surface of the recessed part.

(Supplementary Note 27)

The quantum device described in Supplementary note 23, wherein the first surface is in contact with a chip pin, the chip pin being movable so as to protrude from a bottom of the recessed part.

(Supplementary Note 28)

The quantum device described in any one of Supplementary notes 23 to 27, wherein
the recessed part is formed in a predetermined surface of the sample table, and
a part of the third surface of the first interposer is in contact with the predetermined surface.

(Supplementary Note 29)

The quantum device described in Supplementary note 28, wherein at least a part of a side surface of the first interposer is in contact with a plurality of holding members provided on the predetermined surface.

(Supplementary Note 30)

The quantum device described in Supplementary note 29, wherein
the first interposer is rectangular as viewed in a direction perpendicular to the third surface, and
each of the plurality of holding members holds a side surface of the first interposer near a respective one of corners thereof with its planar part.

(Supplementary Note 31)

The quantum device described in any one of Supplementary notes 23 to 30, wherein the sixth surface is in contact with a cooling member having a cooling function.

(Supplementary Note 32)

The quantum device described in any one of Supplementary notes 23 to 31, wherein the first interposer comprises a first core material, and a thermal via penetrating the first core material from the third surface side to the fourth surface side.

(Supplementary Note 33)
The quantum device described in Supplementary note 32, wherein the thermal via includes a tapered part of which a diameter on the fourth surface side is larger than that on the third surface side.

(Supplementary Note 34)
The quantum device described in Supplementary note 32 or 33, wherein the first interposer further comprises a common connection member configured to connect a plurality of thermal vias to each other.

(Supplementary Note 35)
The quantum device described in any one of Supplementary notes 23 to 34, wherein
the quantum chip comprises a qubit circuit in which pieces of a superconducting material are connected to each other in a circular manner by Josephson junctions,
a recess is formed at a bottom of the recessed part, and
an area where the qubit circuit is formed is included in an area of the recess as viewed in a direction perpendicular to the second surface of the quantum chip.

(Supplementary Note 36)
The quantum device described in Supplementary note 35, wherein the quantum chip is in contact with a pillar extending from a bottom of the recess in the direction perpendicular to the second surface.

(Supplementary Note 37)
The quantum device described in any one of Supplementary notes 23 to 34, wherein
the quantum chip comprises a qubit circuit in which pieces of a superconducting material are connected to each other in a circular manner by Josephson junctions,
a through hole is formed at a bottom of the recessed part, and
an area where the qubit circuit is formed is included in an area of the through hole as viewed in a direction perpendicular to the second surface of the quantum chip.

(Supplementary Note 38)
The quantum device described in any one of Supplementary notes 23 to 37, wherein a side surface of the quantum chip is in contact with an inner surface of the recessed part.

(Supplementary Note 39)
The quantum device described in any one of Supplementary notes 23 to 38, wherein
the recessed part is formed in a predetermined surface of the sample table, and
at least a part of a side surface of the first interposer is in contact with an inner surface of the recessed part.

(Supplementary Note 40)
The quantum device described in any one of Supplementary notes 23 to 38, wherein
the recessed part is formed in a predetermined surface of the sample table,
a stepped surface including a step with respect to the predetermined surface is formed around a mouth of the recessed part, and
a part of the third surface of the first interposer is in contact with the stepped surface.

(Supplementary Note 41)
The quantum device described in any one of Supplementary notes 23 to 38, wherein
the recessed part is formed in a predetermined surface of the sample table,
a stepped surface including a step with respect to the predetermined surface is formed around a mouth of the recessed part, and
at least a part of a side surface of the first interposer is in contact with a side surface between the stepped surface and the predetermined surface.

(Supplementary Note 42)
The quantum device described in Supplementary note 41, wherein a part of the third surface of the first interposer is disposed with a space interposed between the third surface and the stepped surface.

(Supplementary Note 43)
The quantum device described in Supplementary note 41, wherein a part of the third surface of the first interposer is disposed with a spacer interposed between the third surface and the stepped surface.

(Supplementary Note 44)
The quantum device described in any one of Supplementary notes 21 to 43, wherein the socket is disposed so as to be opposed to the sixth surface.

(Supplementary Note 45)
The quantum device described in Supplementary note 21 or 22, wherein the socket is disposed so as to be opposed to the fifth surface.

(Supplementary Note 46)
The quantum device described in any one of Supplementary notes 21 to 45, wherein at least a part of the quantum chip, at least a part of the first interposer, at least a part of the second interposer, and at least a part of the socket are in contact with a sample table having a cooling function.

(Supplementary Note 47)
The quantum device described in any one of Supplementary notes 21 to 46, wherein
the housing includes one end face from which one end of the movable pin protrudes, the other end face from which the other end of the movable pin protrudes, and a side surface connecting a peripheral edge of the one end face with a peripheral edge of the other end face, and
a part of at least one of the one end face, the other end face, and the side surface is in contact with a sample table having a cooling function.

(Supplementary Note 48)
The quantum device described in Supplementary note 47, wherein the socket comprises a heat-dissipating layer, the heat-dissipating layer being exposed in at least one of the one end face, the other end face, and the side surface of the housing, and being in contact with the sample base.

(Supplementary Note 49)
The quantum device described in any one of the Supplementary notes 21 to 48, wherein the socket comprises a positioning pin configured to determine a position of the socket.

(Supplementary Note 50)
A quantum device comprising:
a quantum chip with a first surface and a second surface located on a side opposite to the first surface, in the quantum chip, at least a part of a qubit circuit being provided on the second surface;
a first interposer with a third surface and a fourth surface located on a side opposite to the third surface, the first interposer being connected to the quantum chip in such a manner that the second surface of the quantum chip is opposed to the third surface of the first interposer;
a second interposer with a fifth surface and a sixth surface located on a side opposite to the fifth surface, the second interposer being connected to the first interposer in such a manner that the fourth surface of the first interpose is opposed to the fifth surface of the second interposer; and a socket disposed so as to be opposed to the second interposer, the socket comprising a movable pin and a housing supporting the movable pin, wherein a part of at least one of the quantum chip, the first interposer, the second interposer, and the socket is in contact with a sample table having a cooling function.

According to the present disclosure, it is possible to provide a quantum device capable of improving the coherence thereof while securing terminals to be connected to the outside.

The first, second and third embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A quantum device comprising:
   a quantum chip with a first surface and a second surface located on a side opposite to the first surface, in the quantum chip, at least a part of a qubit circuit being provided on the second surface;
   a first interposer with a third surface and a fourth surface located on a side opposite to the third surface, the first interposer being connected to the quantum chip such that the second surface of the quantum chip is opposed to the third surface of the first interposer; and
   a second interposer with a fifth surface and a sixth surface located on a side opposite to the fifth surface, the second interposer being connected to the first interposer such that the fourth surface of the first interposer is opposed to the fifth surface of the second interposer, wherein
   the quantum chip is disposed inside a recessed part formed in a sample table having a cooling function, and
   a part of at least one of the first interposer and the second interposer is in contact with the sample table.

2. The quantum device according to claim 1, wherein at least a part of the first surface is in contact with an inner surface of the recessed part.

3. The quantum device according to claim 1, wherein at least a part of the first surface is bonded or joined to an inner surface of the recessed part.

4. The quantum device according to of claim 1, wherein the first surface is disposed with a space interposed between the first surface and an inner surface of the recessed part.

5. The quantum device according to claim 1, wherein
   the recessed part is formed in a predetermined surface of the sample table, and
   a part of the third surface is in contact with the predetermined surface.

6. The quantum device according to claim 5, wherein at least a part of one of a plurality of side surfaces of the first interposer is in contact with a plurality of holding members provided on the predetermined surface.

7. The quantum device according to claim 6, wherein
   the first interposer is rectangular as viewed in a direction perpendicular to the third surface, and
   each of the plurality of holding members hold one of the plurality of side surfaces of the first interposer near a respective one of corners thereof with its planar part.

8. The quantum device according to claim 1, wherein the sixth surface is in contact with a cooling member having a cooling function.

9. The quantum device according to claim 1, wherein the first interposer comprises a first core material, and a thermal via penetrating the first core material from the third surface side to the fourth surface side.

10. The quantum device according to claim 9, wherein the thermal via includes a tapered part of which a diameter on the fourth surface side is larger than that on the third surface side.

* * * * *